United States Patent [19]
Laine et al.

[11] Patent Number: 6,133,396
[45] Date of Patent: Oct. 17, 2000

[54] HIGHLY PROCESSABLE HYPERBRANCHED POLYMER PRECURSORS TO CONTROLLED CHEMICAL AND PHASE PURITY FULLY DENSE SIC

[75] Inventors: Richard M. Laine, Ann Arbor, Mich.; Alan Sellinger, Albuquerque, N. Mex.; Kean Wee Chew, Santa Clara, Calif.

[73] Assignee: The Regents of the University of Michigan, Ann Arbor, Mich.

[21] Appl. No.: 09/004,898

[22] Filed: Jan. 9, 1998

Related U.S. Application Data

[60] Provisional application No. 60/035,204, Jan. 10, 1997.
[51] Int. Cl.[7] .................................................. C08G 77/12
[52] U.S. Cl. ............................................. 528/31; 528/14
[58] Field of Search ......................................... 528/31, 14

[56] References Cited

U.S. PATENT DOCUMENTS

| | | | |
|---|---|---|---|
| 4,537,942 | 8/1985 | Brown-Wensley et al. | 528/12 |
| 5,204,380 | 4/1993 | Seyferth et al. | 522/148 |
| 5,556,901 | 9/1996 | Bryson | 524/130 |
| 5,877,104 | 3/1999 | Bryson et al. | 528/31 |

FOREIGN PATENT DOCUMENTS

WO96/15080   5/1996   WIPO .

*Primary Examiner*—Robert Dawson
*Assistant Examiner*—Jeffrey B. Robertson
*Attorney, Agent, or Firm*—Brooks & Kushman P.C.

[57] ABSTRACT

Non-pyrophoric polymethylsilane (PMS) SiC precursors allow for preparation of dense phase pure SiC with 1:1 stoichiometry. Sintering aids may be readily and reproducibly incorporated into the hyperbranched PMS. The PMS has rheology suitable for the preparation of films, coatings, fibers, and for processes such as joining and ceramic infiltration densification.

9 Claims, 6 Drawing Sheets

HIGHLY PROCESSABLE HYPERBRANCHED POLYMER PRECURSORS TO CONTROLLED CHEMICAL AND PHASE PURITY FULLY DENSE SIC

This appln. claims the benefit of U.S. Provisional No. 60/035,204 filed Jan. 19, 1997.

GOVERNMENT RIGHTS

This invention was made in part with Government support under Contract Nos. DAAL-91C-0068 and DAAH04-96-1-0407 awarded by the Department of the Army. The Government has certain rights in this invention.

TECHNOLOGICAL FIELD

The present invention pertains to hyperbranched, highly processable precursors to phase pure, fully dense silicon carbide having a controlled microstructure that can be processed into films, fibers, ceramic-ceramic joins, and particulate and fiber-reinforced composites. These precursors can also be modified to control carbon/silicon ratios to adjust for processing requirements, i.e. to avoid the presence of an unwanted oxide outer coating on reinforcing material that must be removed during composite processing. Unique multiply unsaturated boron/silicon compounds can be used to impart controlled amounts of boron to the precursors.

BACKGROUND OF THE INVENTION

To fully appreciate the nature and breadth of the present invention, it is necessary to review efforts to develop precursors to silicon carbide, SiC. Two reviews, one directed to precursors to silicon containing glasses and ceramics, and the other to precursors to silicon carbide are: R. M. Laine and A. Sellinger, "Si Containing Ceramic Precursors", THE CHEMISTRY OF ORGANIC SILICON COMPOUNDS; Z. Rappoport and Y. Apeloig, eds., J. Wiley and Sons, London, in press 1997, pp. unknown; R. M. Laine and F. Babonneau, "Preceramic Polymer Routes to SiC," CHEM. MAT. 5, 260–279 (1993). These reviews are hereby incorporated as background information.

Ceramic precursor development requires attention to three interrelated criteria: synthesis, control of the polymer-to-ceramic process, and post-pyrolysis treatments. Thus, precursor development involves not only creating a simple and commercially viable synthetic approach; but also involves incorporating molecular architectures or elemental components that provide precursors with acceptable processability, high ceramic yield and environmental stability; generation of desired phase and chemical purity in the final ceramic product; and control of the average grain size and density of the final microstructure so the properties (physical, chemical and/or mechanical) of the resulting material can be tailored to specific applications.

For example, it is generally critical to incorporate controlled quantities of a sintering aid (e.g. 0.1–0.5 wt. % boron) in an SiC precursor, to provide for effective densification on sintering, without excessive grain growth, and without coincidental generation of extraneous phases. For example, at higher than desirable boron concentrations, formation of boron carbide changes the SiC stoichiometric ratio; changes the ceramic microstructure; and importantly, greatly increases the susceptibility of the ceramic product to oxidative degradation. All of these changes lead to loss of chemical, mechanical and electronic properties.

It is insufficient to perform well in only one of the three criteria previously discussed. To be "useful" for fiber forming, one of the most demanding processes in terms of precursor requirements, a precursor must offer: controllable rheology; latent reactivity;[1] controllable pyrolytic degradation; high ceramic yield; high selectivity to desired ceramic product; and controllable densification and microstructural development. The following paragraphs briefly define the requirements of each category. The emphasis is on fiber processing, as fiber processing and products are the most demanding of precursor requirements.

Rheology. The type of fiber forming procedure used (extrusion from solution or melt, with or without drawing) places some constraints on what is considered useful polymer rheology. In general, the precursor should exhibit thixotropic or non-newtonian viscoelastic behavior such that during extrusion, the precursor may flow readily without necking. However, viscosity should be sufficiently high at zero shear so that the formed fiber retains its new shape and is self-supporting. Non-newtonian viscoelasticity normally arises in linear polymers with minimum molecular weights of 10–20 k Da as a result of chain entanglement. However, spinnable preceramics developed to date are low molecular weight, highly branched oligomers that exhibit non-newtonian behavior because the branches entangle. The correlation between rheology and "spinnability" has been discussed.[3,4]

Latent Reactivity. Not only must precursor fibers be self-supporting as extruded, they must also remain intact (e.g. not melt or creep) during pyrolytic transformation to ceramic fibers. Thus, precursor fibers (especially melt spun fibers) must retain some chemical reactivity so that the fibers can be rendered infusible before or during pyrolysis. Infusibility is commonly obtained through reactions that provide extensive crosslinking. Such reactions include, but are not limited, to free radical, condensation, and oxidatively or thermally induced molecular rearrangements.

Pyrolytic Degradation. Most precursors contain extraneous organic ligands that are added to aid processability or provide latent reactivity. During pyrolysis, these extraneous ligands must be eliminated as gaseous products. The rates and mechanisms of decomposition to gases require close monitoring to ensure conversion to the correct ceramic material, to prevent retention of impurities or creation of gas generated flaws (e.g. pores). The processes involved can be likened to binder burnout in ceramic powder compacts.[5,6] In principle, this criterion is best satisfied if hydrogen is the only extraneous ligand required for stability and/or processability. Indeed, there is often a trade-off between precursor stability or processability and ceramic product purity that mandates processing with a less stable precursor to obtain higher quality ceramic products. In this instance, quality is equated with purity as detailed below. For example, Nicalon fibers derived from polycarbosilane, —[MeSiCH$_2$]$_n$—, are not stoichiometric SiC because the original precursor is only processable with a 2:1 C: Si ratio (see below). More recently, polymethylsilane (PMS), —[MeSiH]$_n$—, was found to provide access to phase and chemically pure SiC fibers.

High Ceramic Yield. This criterion, which is product, rather than precursor-property driven, is critical to the design and synthesis of new precursors. The need for high ceramic yields arises because of the excessive volume changes associated with pyrolytic conversion to ceramic materials. Most precursor densities are close to 1 g/cm$^3$, whereas most Si ceramic densities range from 2.5 to 3.5 g/cm$^3$. The density of phase pure SiC is 3.2 g/cm$^3$, for example.

For a ceramic yield of 100% (nothing is volatilized) and where complete densification occurs, the total volume change will still be ≈70%. However, a 100% ceramic yield is unrealistic. Even PMS, which in principle only needs to lose $2H_2$ molecules/monomer unit to form SiC, has a theoretical ceramic yield of 91 wt. %. A precursor with a ceramic yield of ≈50 wt. % (e.g. polycarbosilane)[1] will undergo volume changes of 85%. As a result, achieving near net shape in a final ceramic product becomes very difficult. Furthermore, the 50 wt. % of the precursor that leaves as gases can cause pores, uneven densification and leave behind entrapped impurities. Only in processing thin films or fibers can a 50% ceramic yield still be viable. In such products, mass transport and shrinkage are minimal in at least one dimension (in fibers, the diametrical dimension) and shape integrity can be retained.[1,2] Because diffusion distances for mass transport are very short (in fibers, the diametrical direction), gaseous byproducts can leave easily, permitting ready densification at higher temperatures. Finally, gaseous byproducts represent potential pollution problems that must be dealt with in commercial processes.

Hence, for most applications, high ceramic yield precursors are essential. Consequently, it is important to formulate a preceramic polymer that contains minimal amounts of extraneous ligands that allow it to meet the processability criterion and yet provide high weight percent conversions to ceramic product. Thus, hydrogen and methyl are the precursor ligands of choice, and reasonable ceramic yields typically range between 80–85 wt. %, because most precursor syntheses produce some quantity of low molecular weight species that evaporate rather than decompose during pyrolysis.

It is common to indicate ceramic yields at 1000° C. For oxide ceramics, this temperature is usually acceptable. However, nonoxide ceramic precursors, especially SiC and $Si_3N_4$ systems, often retain 1–2 wt. % hydrogen at temperatures up to 1400° C. In 100 g of material, this corresponds to one mole of $H_2$ per 2.5 moles of SiC if the desired end product is phase pure SiC. A 1000° C. product with 2 wt. % hydrogen can be thought of as a solid solution of SiC and hydrogen. These materials will not exhibit the properties of phase pure SiC; because the hydrogen, which is most likely concentrated along the grain boundaries, does not permit normal microstructural development to occur. Furthermore, outgassing at higher temperatures can cause cracking, compositional changes or pores in ceramic shapes. Thus, care must be taken in reading and reporting ceramic yields.

Selectivity to Phase and Chemically Pure Glasses or Ceramics. Chemical and phase purity are critical issues that drive precursor design because optimal mechanical properties are achieved only with high purity. For example, ceramics grade Nicalon fibers, with a chemical composition of ≈$SiC_{1.45}O_{0.36}$ and densities of 2.3–2.5 $g/cm^3$,[1,2] offer tensile strengths of 2.0–2.5 GPa and elastic moduli of ≈200 GPa. However, stoichiometric SiC fibers have densities >3.1 $g/cm^3$, tensile strengths of 3.0–3.5 GPa and elastic moduli of 400–470 GPa.[1,2] These values are equivalent to literature values for dense, pure SiC produced via standard ceramic processing methods. Despite the higher mechanical properties obtainable, however, chemical and phase purity are not always desirable. For example, H- and N-doped silicon carbide films behave as high temperature semiconductors, while silicon carbonitride glasses offer properties akin to glassy carbon with room temperature conductivities of $10^3$ $(\Omega\text{-cm}^1)^7$. Additional reasons for targeting materials that are not chemically or phase pure stem from the desire to control microstructural properties.

Control of Microstructure and Densification. As noted above, densified products provide optimal mechanical properties. Unfortunately, heating a precursor to high temperatures to convert it to phase pure material frequently does not lead to dense material. For example, precursor-derived phase pure SiC will crystallize and undergo grain growth on heating to 1800° C. However, grain growth occurs without coincidental sintering (densification), leading to porous materials.[8] This problem can be solved by adding small amounts of boron (0.1–0.5 wt. %) which promotes densification without much grain growth. Thus, boron must be incorporated either during precursor synthesis or during processing, to achieve the desired microstructure. In this instance, microstructure drives precursor design.

In some instances, subtle changes in the precursor architecture can change the composition and microstructure of the final pyrolysis product. For example, pyrolysis of —[MeHSiNH]$_x$— leads to amorphous, silicon carbide nitride (SiCN) solid solutions at >1000° C.[2] In contrast, isostructural —[$H_2$SiNMe]$_x$— pyrolyzes to $Si_3N_4$/carbon nanocomposites on heating.[9] The properties of these two materials are quite different.[2]

Essentially all non-oxide and many oxide ceramic fibers currently produced commercially are amorphous, or consist of nanocrystallites in an amorphous phase. Indeed, until recently the general consensus in the ceramics art was that crystalline fibers would fail more readily that glassy fibers because of flaws at grain boundaries.[10] Thus, much research has been directed toward the development of high temperature, glassy fibers with good mechanical and thermal properties. However, phase pure, microcrystalline SiC fibers provide properties and high temperature stability superior to current commercial fibers,[1,2,11] and thus, nano- or microcrystalline fibers may be better in some or many applications, especially where creep is a problem.

In precursors targeted for coatings applications only, where the substrate provides most of the mechanical properties, additional criteria must be considered. First, the precursor must wet the substrate effectively to form uniform, adherent coatings. Some reaction with the substrate may or may not be desirable as a means of achieving either chemical and/or mechanical adhesion. Additionally, to process flaw (pore and crack) free ceramic coatings using dip, spin on, or spray coating processes; it is generally necessary to limit coating thicknesses to <2 μm and more commonly to <1 μm. This is because mismatches in coefficients of thermal expansion and the overall densification process lead to compressive stresses in the films. These stresses can provide improved coating adhesion and abrasion resistance; however, at higher thicknesses the compressive stresses cause coatings to crack, unless a ceramic powder is used as a filler to offset dimensional changes.

The same requirements for coating precursors applies to precursors used to process particulate and fiber reinforced composites by polymer infiltration followed by pyrolysis (PIP). Thus, wetting the surfaces of porous compacts or woven fiber preforms is of utmost importance to obtaining good matrix/reinforcement interfaces which are critical to achieving good mechanical properties. Because the surfaces of the particulates or fibers are often coated with unwanted materials, e.g. oxide layers, it is important to be able to adjust the stoichiometry to be a few percent rich in carbon or silicon to either cause reduction and elimination of the oxide layer or formation of a stable, unreactive oxide interface layer.

These general criteria serve as a basis for the selection of candidate precursors potentially of use for processing both oxide and nonoxide ceramics. For specific materials, additional criteria also play a role, including ease of synthesis and purification, and stability toward air and moisture. One final and critical criterion is cost. Costly syntheses can reduce the general utility of a given precursor. However, in ceramic fiber processing, the pyrolytic conversion and post-processing heat treatments designed to provide optimal fiber mechanical properties often contribute more to product cost than the chemistry of the precursors.

Historically, one of the first routes to a processable SiC precursor was that reported by Yajima et al.[12-14] in 1975 wherein polydimethylsilane was processed to produce SiC containing ceramic fibers. In the Yajima process, polydimethylsilane, obtained from dichloro-dimethylsilane monomer by condensation (dehalocoupling) with sodium metal, is rearranged at 470° C. in Argon to yield Mark I PCS precursor, generally considered to have the formula:

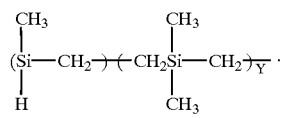

The precursor is melt-spun into fibers and oxidized in oxygen at 200° C. to form cross-linked fibers which may be pyrolyzed in Argon at 1300° C. to form SiC fibers having $SiC_{1.45}O_{0.36}H_{0.003}$ stoichiometry in 60% ceramic yield.

This approach is still used to produce the only commercially available SiC precursor and SiC containing fibers: Nicalon™ fibers (Nippon Carbon, $Sic_{1.45}O_{0.36}H_{0.03}$);[1,12-14] Tyranno™ fibers (Ube Industries, $SiC_{1.43}O_{0.46}T_{0.13}$);[15-17] and Mark I PCS (Shin-Etsu Co.) precursor polymer.[10a] As indicated by their respective compositional formulas, both Nicalon™ and Tyranno™ fibers are not phase-pure SiC. Thus, their properties are inferior to those of phase pure SiC:

TABLE 1

| Type | Tensile Strength (GPa) | Elastic Moduli (GPa) |
| --- | --- | --- |
| Nicalon ™ | 2.0–2.5 | <300 |
| Tyranno ™ | 3.0 | >170 |
| SiC Whisker (single crystal) | 8.0 | 580 |
| Bulk SiC (not pressed) | N/A | 450 |

In addition to not offering properties expected for phase pure SiC, the original Yajima process suffers from other drawbacks that include a multistep precursor synthesis and the inability to self-cure into fiber precursors of sufficient structural integrity such that they may subsequently be pyrolyzed. Finally, the presence of oxygen limits the upper use temperature for both Nicalon™ and Tyranno™ fibers to ≈1200° C. because above this temperature CO and SiO gases evolve, generating defects (large crystallites, pores and voids) that contribute to substantial decreases in mechanical properties.

Because of these disadvantages, tremendous efforts over the past 20 years have focused on developing chemistries/processes to improve or replace the Yajima process. To date, two precursor types have been identified that transform to nearly phase pure SiC. These are polymethylsilane (PMS, (—CH₃HSi—)$_n$) and polysilaethylene,

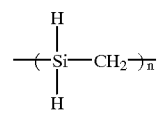

which are related in that on heating to >300° C., PMS transform via the Kumada rearrangement to polysilaethylene.

Both PMS and polysilaethylene or "polyperhydridocarbosilane" have a 1:1 Si:C ratio and in principle are designed to generate phase pure SiC. In practice, this is frequently not the case for a variety of reasons. Several other related precursor systems and processing methods that provide essentially phase pure SiC are also discussed below to provide perspective.

Two general routes are used to synthesize PMS: Wurtz dehalocoupling of $CH_3HSiCl_2$ and transition metal catalyzed dehydrocoupling of methylsilane.

PMS via Dehalocoupling.[18-22] Seyferth et al. and Browning et al. described dehalocoupling of $CH_3HSiCl_2$ with Na (Wurtz coupling) to synthesize PMS. $CH_3HSiCl_2$ is added slowly to a mixture of Na sand in 7:1 hexane: THF with refluxing under Ar for 20 h. The polymer product can be isolated in 60%–70% yield as a viscous, hydrocarbon soluble liquid that gives a negative Beilstein test for Cl. $^1$H NMR characterization indicates Si-H ratios of 3.20:1 to 3.74:1, suggesting a co-oligomer composition consistent with —[MeHSi]$_{0.80}$[MeSi]$_{0.20}$. Thus, 20 mol % of the original Si-H bonds are consumed by Na and/or reactive silyl intermediates (silyl radicals) resulting in Si atoms bonded to three other Si atoms. Thus, this type of oligomer contains few branches or cyclics and is substantially linear.

Molecular weights ($M_n$) of the PMS oligomers range from 500 to 740 Da as determined cryoscopically (benzene), however, polydispersities were not reported. These oligomers are liquid and are spontaneously flammable on contact with air. The low molecular weights lead to low, 10–30%, ceramic yields (10 C/min./950° C.). A typical ceramic composition on pyrolysis is $Si_{1.42}C_{1.00}H_{0.14}$1 and thus not only contains a large excess of silicon, but contains considerable hydrogen as well. Other examples contained yet more silicon.

To increase ceramic yields, a reaction was run in straight THF, yielding a polymer suggested to be a co-oligomer with —[MeHSi]$_{-0.60}$, in 48% yield. However, no molecular weights could be obtained as this material was insufficiently soluble in benzene to permit cryoscopic measurements. It was suggested that this oligomer consisted of rings and chains with branching sites, where MeHSi groups were ring and chain members and MeSi groups were branch sites. A representative, discrete molecule had a methyl hydrogen to silicon hydrogen ratio of 3.6:1, and gave a 60 wt. % ceramic yield of a material with a stoichiometry $SiC_{1.0}Si_{0.49}$, again far from stoichiometric. Slow evaporation of a toluene solution of this material gave a viscous residue from which fibers could be pulled. These precursor fibers, after photolysis in air for 1 h, could then be heated to 1000° C. in $N_2$ to give black ceramic fibers of unknown composition, the integrity of which was ascribed to formation of a thin $SiO_2$ coating on the polymer fiber surface. The same fibers, following photolyzing in nitrogen, yielded only black powder. The researchers noted that results were "not especially promising."

To increase ceramic yields and carbon content, Seyferth et al. explored hydrosilylative crosslinking of PMS with cyclo-[$CH_3$ ($CH_2$=CH) SiNH] 3 using catalytic amounts of AIBN. Reactions using SiH:SiCH=CH$_2$ ratios $\geq 6$ in refluxing benzene provided quantitative yields of soluble precursors with a 68–77 wt. % ceramic yield (1000° C.). The pyrolyzed material exhibited a (SiC)$_{1.00}$-(Si$_3$N$_4$)$_{0.033}$CO$_{0.040}$ composition at 1000° C. but at 1500° C., the ceramic product was "at least partly crystalline." Only SiC was observed (XRD) to crystallize at this temperature. The 1000° C. material is likely to be an SiCN composite. Related attempts to produce processable materials using trivinylsiloxane and trivinylsilathiane gave mixed results. Chain extension with the siloxane gave a polymer with M$_n \approx$3k Da and 70$^+$ wt. % ceramic yields but with considerable SiO$_2$ and excess carbon in the product. The vinylsilathiane derivative gave low ceramic yields that were described as "less satisfactory".

Transition metal promoted dehydrocrosslinking of PMS has also been explored as an approach to increase ceramic yields and SiC purity. Because transition metals, e.g. Ru$_3$(CO)$_{12}$, are known to catalyze redistribution reactions between Si-H and Si-Si bonds,[23] efforts were made to modify PMS via a chain-extension process to generate higher M$_n$'s. For example, 1–2 wt. % Ru$_3$(CO)$_{12}$ added to PMS followed by irradiation for 4 h (140 watts at $\approx$300 nm) provided a polymer with a 55% ceramic yield of a Si rich material. To increase carbon content, Mark I PCS, [(—MeSiHCH$_2$—)$_n$], was combined with PMS in a 1:2 wt. ratio and subjected to the Ru$_3$(CO)$_{12}$ catalyzed crosslinking. Pyrolysis of this polymer gave a 68% ceramic yield of high purity SiC with Si$_{0.99}$C$_{1.00}$ stoichiometry. This approach suffers from being a multistep process and requiring the relatively rare metal ruthenium.

Metallocene (i.e. Cp$_2$ZrH$_2$) catalyzed dehydrogenative crosslinking of PMS has also been considered as another method of increasing ceramic yields and carbon content during transformation of PMS to SiC:[19-22]. The addition of 0.6 mol % Cp$_2$ZrH$_2$ to a hexane solution of PMS followed by refluxing for 2 h, resulted in loss of Si-H bonds, as determined by NMR, especially the SiH$_2$ groups.[24] Pyrolysis to 1500° C. gave ceramic yields of 70–80% with SiC purity as high as 98%, with ZrC and Si the primary contaminants in 1.6 and 0.4 wt. % respectively, SiC$_{0.99}$C$_{100}$Zr$_{0.02}$. Unfortunately, fibers drawn from this PMS required UV curing for 1.5 h prior to pyrolysis to retain the fiber shape. Additionally, the metallocene catalysts renders PMS highly oxygen-sensitive and pyrophoric.

While Seyferths' work on metal catalyzed modification of PMS increased ceramic yields and improved product stoichiometry, the processes developed possessed numerous drawbacks as well, including starting oligomers that are not self-curing, and which in addition are pyrophoric; catalysts (Cp$_2$ZrH$_2$) that are both expensive and pyrophoric; and the use of Ru catalysts, which are both expensive as well as being good oxidation catalysts, thus increasing the products' susceptibility to oxidation.

PMS By Catalytic Dehydrocoupling of MeSiH$_3$. PMS can also be synthesized by catalytic dehydrocoupling of methylsilane, (MeSiH$_3$) using Cp$_2$MMe$_2$, (M=Ti,Zr) catalysts, as described by Harrod et al. and Laine et al.[24,26,27]

The reaction is run in a toluene/cyclohexene solvent system at 25°–60° C. under $\approx$10 atm. MeSiH$_3$ for 1–9 days using 0.2 mol % catalyst. The H$_2$ byproduct is consumed simultaneously by metal-catalyzed hydrogenation of cyclohexene to cyclohexane, to minimize pressure build-up and depolymerization. PMS, for which $^1$H NMR suggests a partially branched structure, can be obtained in >90% yield. SEC indicates M$_n \approx$1200–1300 Da (DP$\approx$30) with a PDI$\approx$5–10. Pyrolysis (1000° C./1 h/10° C./min/Ar) provides a $\approx$77 wt. % ceramic yield of a material with a composition of Si$_{1.0}$C$_{0.9}$H$_{>0.2}$O$_{0.1}$ (6.0, 0.5 and 4.0 wt. % excess Si, H and O respectively).[26,27] The oxygen appears to arise from handling. Note that percent excess silicon is considerably lower than that found on pyrolysis of the dehalocoupling reaction derived PMS materials which are, on average, half the molecular weight. Thus, nominal increases in molecular weight appear to be quite important in giving high ceramic yields and Si:C stoichiometries.

The PMS produced by the above process could be hand drawn or extruded to provide precursor fibers with diameters of 10–60 μm. These fibers melt on heating to 90–100° C. Fibers exposed to a nitrogen plasma, NH$_3$, γ- irradiation or UV for several hours survived heating to 1000° C., but distorted during the pyrolysis process and were not deemed useful.

Further efforts to improve the infusibility of the fibers led to the direct introduction of vinylsilanes and silazanes as chain extenders designed to increase molecular weights such that the resulting PMS would decompose before it melted. Titanocene and zirconocene catalysts are known to promote hydrosilylation of terminal alkenes but not internal alkenes,[24] thus efforts were made to directly introduce polyfunctional vinylsilanes to increase the molecular weight of the chains. However, introduction of $\approx$10 mol. % (20 wt. %) dimethyldivinylsilane to a typical PMS solution produced fibers which melted. Adding 10 wt. %. tetravinylsilane (TVS) provides infusible fibers that convert to phase pure stoichiometric SiC fibers.

Zhang et al. suggest that a lightly branched polymer structure results from addition of 10 wt. % tetravinylsilane (TVS) to PMS. However, the modified PMS still has insufficient molecular weight to produce spinnable materials. To obtain spinnable precursors, the modified polymer must be further heated to 80–90% of its gel time prior to reaction with TVS to get a spinnable fiber. The gel time for each batch of PMS must be determined empirically as the active catalyst concentration is very sensitive to any reaction impurities, e.g. chlorine or oxygen-containing materials. Thus, this step is long, arduous and dangerous because the precursor continues to be spontaneously flammable even after reaction with TVS.

Once the TVS has been added, the polymer can be spun directly from solution. Green precursor fibers can be spun and heated at rates up to 20° C./min to 1000° C. to form phase pure, SiC. However, the SiC crystallite sizes at this temperature are 2–4 nm (Debye-Scherrer), and the fibers retain excess hydrogen that can only be removed on heating to >1400° C. The fiber densities can be increased to nearly theoretical by heating to temperatures of >1600° C. in argon. Despite the ability to obtain phase pure material and full density, the dense fibers are actually quite porous, exhibiting very large crystallites (grain sizes of 1–3 μm) with many large pores, resulting from sintering without densification. Given that boron, in very small quantities (typically 0.1–0.5 wt. %), is known to aid in sintering SiC,[30-34] efforts were made to incorporate boron into TVS-PMS by hydroborating residual vinyl groups with a variety of boranes, including borane-methyl sulfide (Me$_2$S·BH$_3$), borane-tetrahydrofuran (THF·BH$_3$), borane-ammonia (NH$_3$·BH$_3$), borane-trimethylamine (Me$_3$N·BH$_3$), and borane-piperazine (C$_4$H$_9$N$_2$·BH$_3$) complexes. Only the Me$_2$S·BH$_3$ complex reacted with TVS-PMS to provide clear solution. All the other B-containing compounds precipitated out from the TVS PMS solution before or after volume reduction (under vacuum). Indeed, it appears that the catalyst is necessary to promote boron incorporation. The amount of boron incorporated was not known because it is difficult to control the reaction, but it was assumed to be on the order of 0.2 wt. %.

Although dense (3.1 g/cm$_3$), phase pure fibers could be prepared from boron-containing TVS-PMS or TVSB-PMS, the process of preparing the precursors has numerous disadvantages: MeSiH$_3$ is costly and pyrophoric, forming potentially explosive mixtures with ambient air; the reaction must be conducted under pressure to provide PMS; (3) the Ti/Zr dehydropolymerization catalysts used are pyrophoric; and (4) the metallocene derived TVSB-PMS is also highly pyrophoric. For example, exposure of TVSB-PMS samples to dry air results in rapid oxidation at room temperature as shown by TGA. Indeed, polymer samples ignite spontaneously in air. Further, disadvantages are that the synthesis is multistep and inconsistently reproducible because the catalysts used are very sensitive to impurities. Fiber spinning and all other types of precursor processing must be performed in to the complete absence of air until materials have been pyrolyzed to ≈1000° C.

Tanaka et al.[35] also describe MeSiH$_3$ dehydropolymerization to PMS in 68% yield, using CP$_2$NdCH(SiMez)$_2$ as catalyst. $^1$H NMR analysis showed a SiCH$_3$:SiH, ratio of ≈3:1 suggesting a linear polymer with no branching: SEC analysis gave M$_n$=1470 Da with a PDI=5.00, very similar to the values reported by Harrod. Pyrolysis to 900° C. in Ar provided ceramic yields ≈74%. with excess Si metal (amount not reported). To balance the excess Si, polyphenylsilane (Mw=1600 Da, 22 wt. %) was blended with PMS to give phase pure β-SiC in 58% ceramic yield. The disadvantages to this process, in addition to those described above for MeSiH$_3$, include: the necessity for use of Nd catalysts for large scale reactions; and (2) the low (58%) ceramic yields.

PMS By Catalytic Dehydrocoupling of CH$_3$SiH$_2$SlH$_2$CH$_3$. Hengge et al.[36] studied Cp$_2$MMe$_2$ (M=Ti,Zr) catalyzed dehydrocoupling of CH$_3$SiH$_2$SiH$_2$CH$_3$. They report that Cp$_2$ZrMe$_2$ catalytically dehydropolymerizes neat, liquid CH$_3$SiH$_2$SiH$_2$CH$_3$ at room temperature in minutes to give an insoluble material with a general composition of H—[(MeSiH)$_{0.58}$ (MeSi)$_{0.42}$]$_n$—H. During reaction, the liquid initially turns yellow, then orange as H$_2$ evolves vigorously and then gels. The resultant crosslinked polymer is insoluble in common solvents, decomposes before melting and is pyrophoric. Pyrolysis provides ≈88% ceramic yields (1500° C./Ar) of SiC.

The Hengge process appears attractive because the starting dimer offers a 1:1 Si:C ratio, is a liquid, rather than gaseous CH$_3$SiH, polymerizes rapidly, and produces a ceramic product which appears to be phase pure SiC. However, the dimer starting material requires an expensive LiAlH$_4$ reduction of CH$_3$SiCl$_2$SiCl$_2$CH$_3$ which may be obtained from byproduct distillation of alkylchlorosilane "direct process" residue; and the resulting polymers offer no rheological utility: i.e. cannot be drawn into fibers, and are pyrophoric.

CH$_3$SiH$_2$SiH$_2$CH$_3$/(CH$_3$)$_2$SiHSiH$_2$CH$_3$ mixtures can be copolymerized using Cp$_2$ZrMe$_2$ as shown above for MeSiH$_3$.[29] However, the resultant polymer gives low ceramic yields (50–60 wt. % at 1000° C.) and is difficult to process. If the reaction is heated slowly to 250° C., a pyrophoric yellow glassy solid forms in 15–20% yields, that is toluene soluble. LiAlH$_4$ reduction of the redistribution product gives a polymer with a —(MeSi)$_{0.91}$(Me$_2$Si)$_{0.09}$ (H)$_{0.4}$-composition. Pyrolysis to 1560° C. gave 90% ceramic yields of "essentially pure SiC", although no quantitative analyses were given. Given the above polymer composition, the theoretical yield to SiC would be 88.4%, suggesting the presence of excess carbon.

The advantages offered by this process are a one-step synthesis to poly(methylchlorosilanes) employing low cost dimers as starting materials; and fiber processing that leads to phase pure SiC fibers. The primary drawbacks to the process are the low precursor yield (15–20%); a multi-step process; a pyrophoric precursor; and the high cost of LiAlH$_4$ reduction of the chlorinated polymer.

Polycarbosilanes as Precursors of SiC. Pillot et al.[41] reported the Wurtz polymerization of 2,4-dichloro-2,4-disilapentane (DCDP) to give a precursor to SiC. DCDP was synthesized via Mg/Zn coupling of dichloromethane with excess methyldichlorosilane in 35% yield. DCDP was polymerized via Wurtz coupling, followed by LiAlH$_4$ reduction of residual Si-Cl, to poly(disilapentane) in 61% yield with Mn=1400 Da and PDI=3.1. On heating to 300–350° C., poly(disilapentane) converts to the corresponding polycarbosilane (M$_n$=7650 Da, PDI=3.0, softening point ≈245° C.). Pyrolysis of this polycarbosilane gave ceramic yields of 79% (vs. 78% O. theoretical) with a 1.08 C:Si ratio and 1.1 mol %. The source of oxygen was not discussed, but is assumed to occur during handling. Direct pyrolysis of the polymer without prior heat treatments gave <10 wt. % ceramic yields.

A related poly(disilapentane) precursor was developed by Corriu et al.[42] via metallocene catalyzed dehydropolymerization of 1,4-disilapentane (DSP). DSP was synthesized in 85% yield in two steps from the Pt-catalyzed hydrosilylation of vinylSiCl$_3$ with MeSiHCl$_2$ followed by LiAlH$_4$ reduction. Reacting DSP with 0.5 mol % Cp$_2$TiMe$_2$ at room temperature for 48 h gave a polymer with M$_n$=900 Da and PDI=1.05. $^1$H, $^{13}$C and $^{29}$Si NMR analysis indicate formation of a linear polymer with no reaction at the resulting SiH$_2$ sites. Reactions run for 72 h showed partial depletion of the SiH$_2$ groups giving branched, highly viscous liquids with Mn=3260 Da and PDI=10.1. At 50° C., crosslinking occurred rapidly to give an insoluble material within 30 min. Both low (Mn=990 Da) and high (Mn=3260 Da) molecular weight products gave high ceramic yields (>73 wt. % yield vs. 78 wt. % theoretical) of nearly phase-pure SiC (Si$_{1.01}$C$_{1.00}$) after pyrolysis. Conversion to crystalline β-SiC commenced at 1100° C. and was complete by 1400° C., as determined by XRD. Ti was necessary during the pyrolytic transformation to SiC, as samples of poly(2,4-disilapentane) pyrolyzed without Ti gave 30% ceramic yields.

Phase Pure SiC via Processing. Many modifications to the existing Yajima polycarbosilanes (PCS) precursors have been reported in efforts to improve ceramic yields, phase purity and the mechanical properties.[1,2] Only a few of these actually provide phase pure SiC through processing efforts alone. For example, thermally stable, substantially dense polycrystalline SiC fibers (>2.9 g/cm$^3$ vs. 3.2 g/cm$^3$ theory) can be processed from polydimethylsilane derived PCS by adding boron during the processing step.[45] PCS is first melt spun into fibers at ≈300° C. and sequentially exposed to NO/diborane, or ammonia/BCl$_3$ or NO$_2$/BCl$_3$ gases (rather than O$_2$) at temperatures between 25°–200° C. for periods of 4–24 h to render the fibers infusible. The residual N,O and excess carbon are eliminated during sintering, as gaseous byproducts (e.g. SiO and CO) at 1400° C. resulting in pores and voids, that weakened the fiber. However, continued heating to >1600° C. results in smooth densification (decreasing porosity) and overall strengthening of the fiber.

The final, stoichiometric β-SiC fibers have oxygen contents of <0.1 wt. %, when heated >1600° C. The amounts of residual B are not discussed; although they could be as high as 5 wt.[46] The fibers exhibit average tensile strengths of 2.6 GPa and elastic moduli >420 GPa, but lose 50% of their tensile strength on exposure to air at 1200° C. for 40 h. Nicalon fibers also fail to survive similar heat treatments. The advantages to these fibers are that they rely on an existing process and provide properties expected of fully dense, phase pure SiC.

DeJonghe et al. have reported that simply heating Nicalon or Tyranno fibers at temperatures of ≈1600° C. with sources of boron (e.g. boron metal, $TiB_2$, etc.) leads to sufficient incorporation of boron into the fibers such that they densify and stable nearly phase pure SiC fibers are obtained, although no data is provided relative to fiber composition.[47] Toreki et al. have described processing SiC fibers (UF fibers) from a novel PCS with low oxygen content and better high temperature stability than Nicalon fibers.[48] The PCS was synthesized by pressure pyrolysis of polydimethylsilane in an autoclave. Fibers derived from PCS with Mn <5000 Da melted before curing, while those derived from PCS>10000 Da were not soluble, thus not suitable for spinning fibers.

In the presence of spinning aids (polysilazane and polyisobutylene), PCS of Mn≈5000–10000 Da can be dry spun and the pyrolyzed in $N_2$ to form SiC containing fibers. The polymer is self-curing, and provides fibers in 80% ceramic yields (950° C., 20° C./min.) . The fibers have low oxygen content (1.1–2.6 wt. %) and mechanical properties similar to Nicalon (tensile strength ≈3.0 GPa, ambient), but contain excess carbon, and thus perform below expectations for phase pure SiC. Sacks et al. have recently[49] described near stoichiometric SiC fibers (≦0.1 wt. % O) with high tensile strength (≈2.8 GPa), fine grain sizes (≈0.05–0.2 μm), high densities (≈3.1–3.2 g/cm$^3$) with small residual pore sizes (≦0.1 μm). The synthesis of the polymer precursor for this process was not reported. However, it was stated that dopant additions were made The fibers (designated UF-HM fibers) retained ≈92% of their initial strength (2.70 GPa) after heat treatments to 1800° C., suggesting the dopants contained B or other sintering agents to prevent grain growth. Electron microprobe analysis (EMA) showed an average fiber stoichiometry of $Si_{0.93}C_{1.00}$.

As can be seen from the foregoing, both SiC precursors as well as precursor processing into SiC fibers, coatings, and other forms still require considerable improvements. It would be desirable to provide precursors which may be derived from relatively inexpensive starting materials without resort to use of expensive $LiAlH_4$ reduction, or to expensive and pyrophoric organometallic catalysts. It would be especially desirable to provide precursors which are not pyrophoric, and which can be handled safely in normal ambient atmospheres. It would be yet further desirable to provide precursors which have rheologies suitable for spinning into fibers, for forming coatings, and for use as binders and infiltrants. It would be still further desirable to provide precursors whose chemistry may be altered to provide products having a targeted SiC ratio, optionally containing targeted amounts of additional elements and/or compounds.

SUMMARY OF THE INVENTION

The present invention pertains to PMS-type SiC precursors and to processes for their preparation and their use. The SiC precursors may be distinguished from prior art precursors by their lack of pyrophoricity, and ease of preparation from low cost starting materials. The rheology of the precursors makes them suitable for preparing SiC fibers and for other applications including coating, composite densification, and joining.

DETAILED DESCRIPTION OF THE INVENTION

Figure 1:
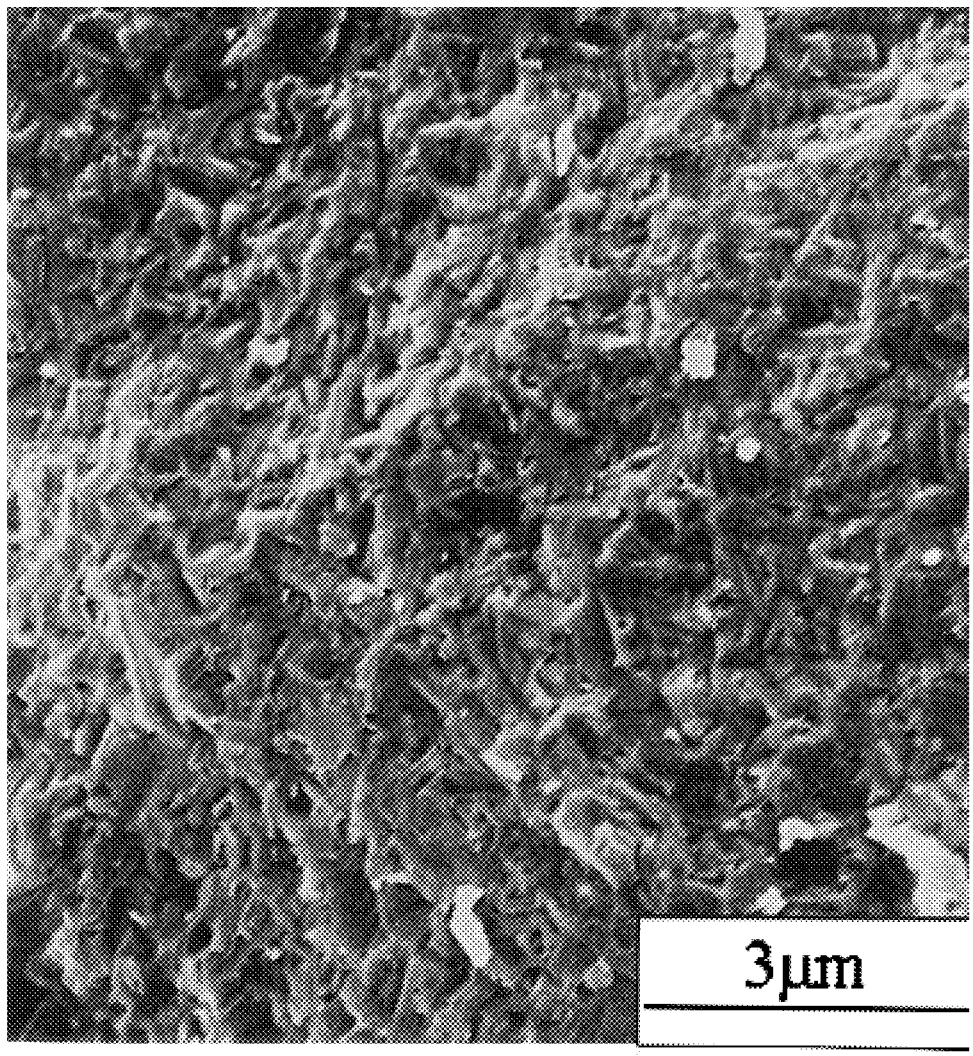
FIG. 1. Photomicrographs of phase pure, dense SiC fibers.
Figure 1A:
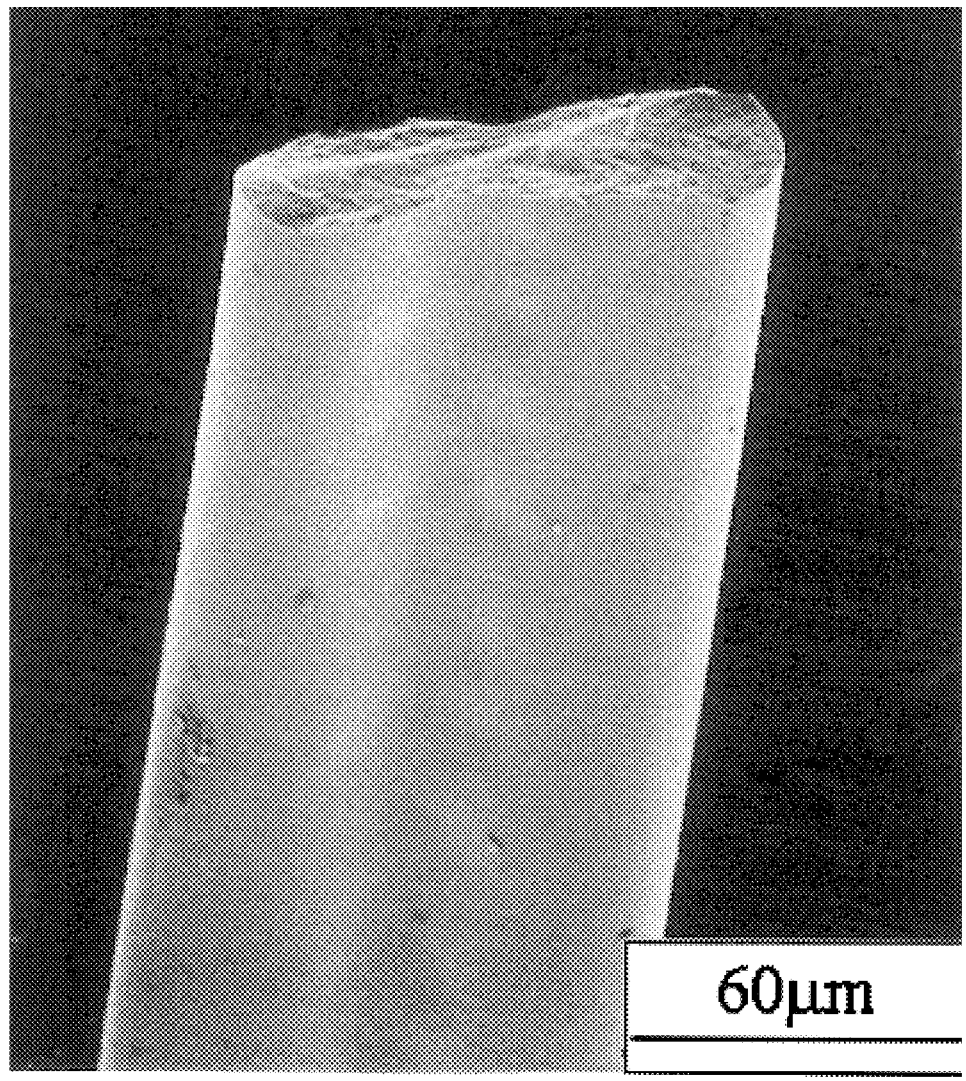

In order to prepare suitable SiC precursors, it is important to utilize a precursor with a controlled and near stoichiometric Si:C ratio. Thus, a PMS-type precursor is required. However, past attempts to prepare PMS from $MeSiH_3$ have always led to pyrophoric products which were frequently unable to produce SiC with good ceramic yield and phase purity. PMS precursors prepared from $MeHSiCl_2$ also resulted in pyrophoric products. With both types of PMS, high ceramic yields are obtainable only by increasing precursor molecular weight using expensive, and generally phyrophoric catalysts. Incorporation of sintering and densification aids into the polymer structure proved to be erratic at best.

The approach employed in the present invention is to lower pyrophoricity by decreasing the numbers of —$SiH_2$— groups in the precursor. One means of achieving this objective is to increase polymer solubility during dehalocoupling polymerization of $MeHSiCl_{21}$ resulting in higher molecular weight products containing significant quantities of cyclic and polycyclic polysilanes substituted with methyl groups and hydrogen. Due to the large number of fused rings and polycyclic structures, these polysilanes have methyl hydrogen to silane hydrogen ratios which are high, generally c.a. 5 or more. As a result, the overall composition's methyl hydrogen to silane hydrogen ratio is high as well, generally greater than 4.0. These high ratios are believed characteristic of polysilanes having few —$SiH_2$— groups. As a result, the precursors are surprisingly air stable, and can be chain-extended without excessive crosslinking yielding high molecular weight yet soluble and processable products.

The method of preparation of the novel precursors of the present invention is not critical so long as a precursor which is non-pyrophoric is obtained. In the preferred method, the starting material, $MeHSiCl_2$ is coupled by employing an amount of alkali metal or other dehalocoupling agent in but slight stoichiometric excess relative to chlorine, in a solvent in which the growing polymer is soluble. Significant gelling and precipitation is avoided. The resulting polymers have a higher molecular weight than when larger quantities of alkali metal are used. Due to the use of a solvent which promotes polymer mobility, and possibly also due to the lower amount of dehalocoupling agent, the structure of the precursors are different from prior art PMS as well, exhibiting an exceptionally high methyl hydrogen to silane hydrogen ratio. The products are not only substantially non-pyrophoric, but in addition are capable of forming SiC with stoichiometric or near stoichiometric Si:C ratios. Moreover, adjustment of the Si:C ratio to provide enrichment of silicon or carbon for particular applications, and incorporation of boron, aluminum, or other sintering aids into the polymer structure may be reproducibly accomplished.

In a particularly preferred embodiment, an unsaturated hydrocarbon-containing Group IIIa/silicon mixed metal compound is prepared by reacting a borane with a silane substituted with minimally three reactive unsaturated hydrocarbons, such as, in a non-limiting sense, vinyl, ethynyl, propenyl, allyl, and isopropenyl groups. Examples of unsaturated silanes include methyltrivinylsilane, methyltriallylsilane, divinyldiallylsilane, vinyltriallylsilane, tetrakis(isopropenyl)silane, and most preferably, tetravinylsilane (TVS).

Figure 2:
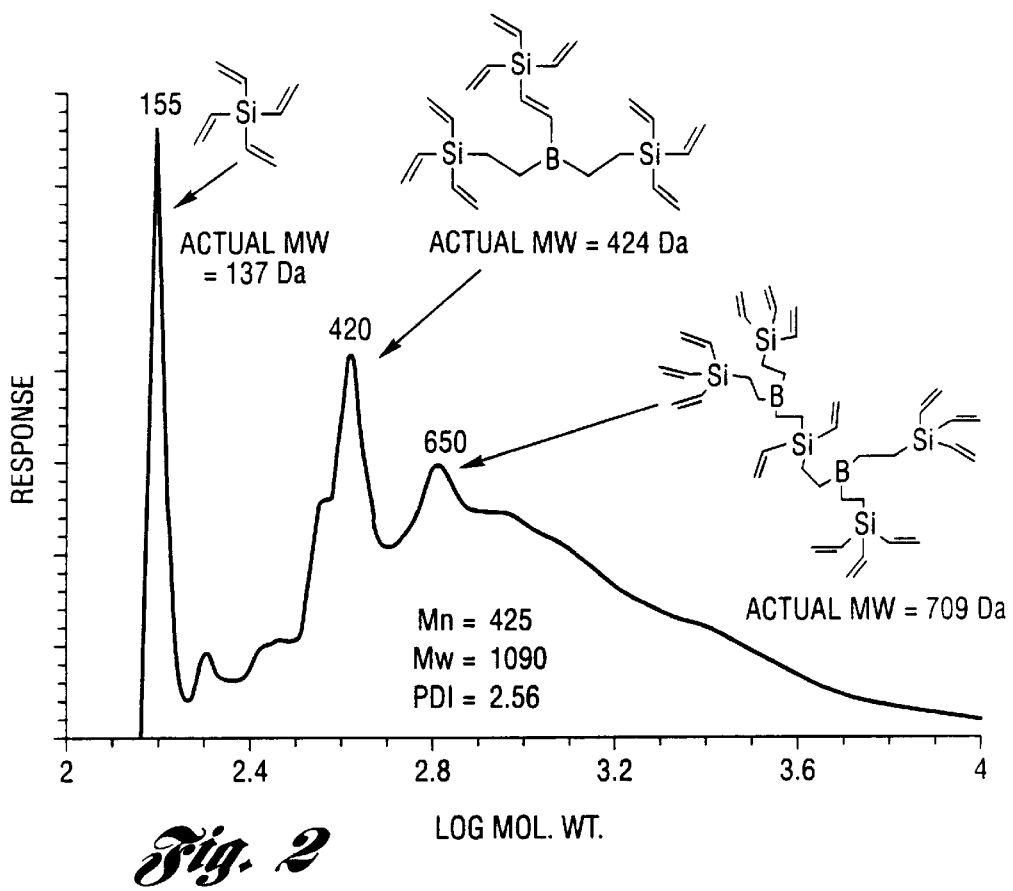
FIG. 2. Size Exclusion Chromatogram (SEC) and product structures of TVSB reaction.

Among the Group IIIa compounds which are useful are boron compounds such as borane ($BH_3$), diborane, borazine ($B_3N_3H_6$), and the like; and aluminum compounds such as aluminum hydride, etc. Reaction of the Group IIIa metal compound with the unsaturated silane may be catalyzed or uncatalyzed. The result is generally single compound or a mixture of single compound or compounds having Group IIIa metal centers bonded to silicon atoms through an intervening $C_2$ or greater hydrocarbon bridging group. Examples of such products, produced by reaction of borane with TVS are illustrated in FIG. 2.

Due to the presence of an excess of unsaturated groups, the unsaturated Group IIIa/silicon compounds may be reacted with PMS in a hydrosilylation reaction, coupling many such molecules into highly branched structures of higher molecular weight. The amount of Group IIIa metal incorporated into the precursor may be adjusted with precision. Moreover, excess unsaturated groups may serve to photolytically, thermally, or otherwise crosslink precursor-derived fibers, ensuring their structural integrity during pyrolysis.

Alternatively, similar polymers may be produced by adding a condensable sintering aid into the dehalocoupling mixture. By condensable sintering aid is meant that the particular element or compound will condense along with the $MeHSiCl_2$ reactant to form branched polymers incorporating the sintering aid at branch points. The condensable sintering aid must be minimally trifunctional, and is preferably aluminum or boron. Suitable condensable aluminum or boron compounds include the respective halides, particularly aluminum chloride and boron chloride. In this method of preparing precursors, the condensable sintering aid, $MeHSiCl_2$, and alkali metal are co-condensed with the aid of a dehalocoupling agent. The co-condensation may be concurrant or sequential. Further details on the characteristics and means of preparing and processing the precursors is given below.

The most reactive sites on the PMS chains are thought to be the $SiH_2$ moieties. Thus, a mechanism was sought to produce PMS oligomers with only limited amounts that could still be used to form polymers that were rheologically useful. Furthermore, a mechanism was sought wherein the amount of boron could be carefully controlled/limited. The solution appeared to be a novel approach that entailed production of a hyperbranched precursor.

Hyperbranched polymers consist of a high number of branches with very short chain lengths of irregular numbers of monomer units separating the branches. Dendrimeric materials have highly regular, factual structures wherein all of the branches are evenly separated by chains of equal length. The extensive degree of branching in both structures provides for very good interchain interactions (chain entanglement) that provides useful rheological properties even at low molecular weight. The term "hyperbranched" as used herein includes dendritic structures. An important feature of these types of polymers is that one can point to an interior molecular architecture that provides the basis for the highly branched structure. This interior architectural feature must be a polyfunctional species that ensures that polymerizations initiated at the functional sites lead to extensive branching. Also important is that this architectural feature is likely to represent a very small portion of the total molecular weight of the polymer.

Thus, a novel hyperbranched precursor wherein the necessary interior architectural feature contains a polyfunctional boron (or aluminum, also used in sintering SiC) species would provide the low concentrations of boron or aluminum needed to promote densification of the final SiC shape with control of the microstructure. Furthermore, because this polyfunctional Group IIIa metal species may be the beginning point for polymer synthesis, it provides good control of the final sintering aid content in the precursor polymer and (assuming high ceramic yields) in the final ceramic product.

The simplest polyfunctional boron compounds that can provide the key architectural element are borane and borazine. Both of these molecules are trifunctional. The $BH_3$ molecule is readily available, inexpensive and reacts with alkenes at near room temperature (as the THF complex). Borazine is also readily available[50] but requires a catalyst to react with alkenes. Borazine would provide three times as much boron as $BH_3$ and may offer the potential to incorporate nitrogen into resulting ceramic product which is of interest for high temperature semiconductor devices. However, for some applications, N may inhibit microstructural development which may be detrimental to the final ceramic mechanical properties. Still another alternative is to use $BX_3$ (X=Cl,Br,etc.) which could be used as shown below. Thus, $BH_3$ becomes the simplest starting point for branching.

The next step is to increase the functionality so that further branch points may be added. Because $BH_3$ normally reacts readily with alkenes, polyfunctional alkenes were used to create these next branch points. Some examples of simple polyfunctional alkenes include trivinylsiloxand, trivinylsilathiane and trivinylsilazanes; however, as taught in the art, these compounds offer problems in that the final ceramic products contain important amounts of impurities (e.g. $SiO_2$), poor ceramic yields or poor control of microstructural development. Furthermore, $Me_2Si(vinyl)_2$ was shown by Zhang to be inadequate for providing higher molecular weight PMS that was self-curing. Thus, tri- and tetrafunctional unsaturated silanes, preferably TVS, are used to create the next branch points.

TVS reacts quite readily with $THF-BH_3$, and in excess TVS, size exclusion chromatography shows only a peak for $B(TVS)_3$. A typical synthesis is provided below but is not meant to be constraining, and those versed in the art will recognize the number of reasonable variations that can be used. For example, other sources of borane can be used.

Synthesis of tetravinylsilane (TVS)/Borane ($BH_3$) Complex (TVSB)

Borane/THF complex (7.8 mL of 1 M solution, 7.8 mmol $BH_3$) was added to a 25 mL schlenk flask equipped with a magnetic stir bar under Ar. The solution was cooled to −78° C. and tetravinylsilane (TVS) (4 mL, 23.4 mmol) was slowly added via syringe. The solution was allowed to warm slowly to room temperature resulting in a clear, colorless solution (30 vol. %) $^1$H-NMR ($C_6D_6$) δ6.3–5.7 (m,27H, SiCH=CH$_2$), 2.1–0.8 (br and m, 30H, BCH$_2$CH$_2$Si). $^{29}$Si NMR ($C_6H_6$) δ5.3–4.9 (m, 1Si, SiCH$_2$CH$_2$) –16.5, –16.8, –17.3, –18.1, –19.0, –19.3 (m, 6.8 Si (CH$_2$CH$_2$)$_{1-3}$Si (CH=CH$_2$)$_{3-1}$]-26.0 (s, 5.6Si, Si(CH=CH$_2$)$_4$. SEC M$_n$=424, PDI 2.56. Mass spec. (EI): m/z=286,422 (M+), 436.

Despite the clean analyses, that suggests that only B[CH$_2$CH$_2$)Si(CH=CH$_2$)$_3$]$_3$ forms, any time two polyfunctional molecules are reacted the resulting product is likely to consist of a range of species as suggested by the size exclusion chromatogram (SEC) results, which indicate a range of molecular weights including some unreacted TVS and several principle TVSB species, as shown in FIG. 2.

Following synthesis of the branch-inducing, boron-containing starter molecule, a method of synthesizing a suitable PMS derivative that could be attached to the polyvinyl functionality inherent in TVSB. The critical issue is to avoid making a flammable material. It was rationalized as noted above that by minimizing the SiH$_2$ endgroups that flammability would also diminish.

Note that Seferth et al. teach that dehalocoupling leads to low molecular weight, liquid PMS precursors that are flammable and offer low ceramic yields that are not close to the SiC stoichiometry. Furthermore, the reaction times required are 20 h long. Furthermore, if pure THF is used, the solubility of the resultant PMS becomes a problem and it is not as processable. Finally, Seyferth et al teach the use of 2.5 equivalents of Na per equivalent of MeHSiCl$_2$. These PMS materials of the prior art are flammable, require long preparation times, generate products with low ceramic yields with unsatisfactory stoichiometry. Moreover, the rheology of many of the materials is not suitable for many uses which require liquid or soluble precursors. Thus, an entirely new approach to forming precursors was necessary.

Given an interest in minimizing reaction time, minimizing the hydrogen content of the resulting PMS and avoiding the use of LiAlH$_4$, preparation of a PMS material with a small chlorine content that might limit the formation of SiH$_2$ groups was sought. Thus, the amount of Na used was reduced to 2.05 equivalents. This leaves some 1–2 wt. % Cl still in the resulting PMS. This PMS cannot be used with metallocene catalysts because the Cl content will poison the catalyst. It is also likely that this amount of Cl will poison the Ru catalysts used for photolytic crosslinking. The amount of alkali metal or other dehalocoupling agent is thus adjusted to purposefully retain residual chlorine. Amounts in the range of 2.0 equivalents to 2.3 equivalents are especially preferred.

Given that the PMS materials appear to be more soluble in toluene than in hexane and in view of the fact that the dehalocoupling process is a condensation reaction that requires that the growing polymer chain remain soluble as molecular weights increase, synthesis of PMS run in toluene/THF. Surprisingly, a quite different polymer results than the type described previously in the literature. A typical synthesis is provided below but is not meant to be constraining and those versed in the art will recognize the number of reasonable variations that can be changed and yet still provide similar products.

EXAMPLE 1

Synthesis of Polymethylsilane (PMS-C1) From Methyldichlorosilane (MeSiHCl$_2$) and Na Na (48 g, 2.09 mol) was placed in 150 mL xylene in a 500 mL Erlenmeyer flask and heated to ≈110° C. When the Na melted, the flask was gently swirled to make 6–8 lumps of metallic sodium separated from the Na oxides. The mixture was then cooled to room temperature with a gentle N$_2$ gas purge. The lumps were then quickly weighed in dry toluene (≈47 g, 2.05 mol, ≈1 g of oxides separated) and transferred to an Ar purged 1 L three-necked round-bottom flask containing 150 mL dry toluene and equipped with a reflux condenser, 250 mL addition funnel, magnetic stir bar and rubber septum. The mixture was heated to reflux and stirred rapidly to make high surface area sodium sand. When the mixture had cooled to room temperature, an additional 235 mL dry toluene and 65 mL dry THF were added. The final ratio (v/v) of toluene/THF is 6/1. The mixture was heated to 80° C. and MeSiHCl$_2$ (105 mL, 1.00 mol) was added via the addition funnel at a rate to maintain a gentle reflux (≈1 h). Great care must be taken not to add the monomer too quickly as the reaction is highly exothermic. The mol ratio of Na/MeSiHCl2$_2$ is 2.05/1. The dark blue mixture was then stirred for an additional 4 h. at 80° C., cooled to room temperature and filtered under slight vacuum into a 500 mL schlenk flask. The dark blue ppt. was washed with an additional 100 mL toluene. The filtered, pale yellow PMS solution gives yields of ≈85–90%. $^1$H-NMR ($C_6D_6$) δ5.1 (s, 0.02H, SiHCl), 3.93 (br, 1.0H, SiH, SiH$_2$), 0.43 (br, 4.8H, SiCH$_3$). $^{13}$C NMR ($C_6D_6$) δ–9.3 (br, SiCH$_3$). $^{29}$Si NMR ($C_6H_6$) δ–61.9, –64.9 (narrow, SiSiH$_2$), endgroup), –67 →–70 (br, Si$_2$SiH, main chain(, –66 →–74 (b, Si$_3$Si, branch point) ppm. IR 2957 m, 2894 m, 2796 w, 2084 s, 1409 m, 1248 m, 1048 w, 932 m, 866 s, 770 s, 685 s, 641 s cm-1. SEC; Mn=800–1000 g/mol, M$_w$=1370–3000 g/mol, PDI =1.85–3.00. TGA (N$_2$); 50–60 wt. % (exp.), 90.9 wt. % (calc.).

EXAMPLE 2

Synthesis of Polymethylsilane (PMSB-C1) From Methyldichlorosilane (MeSiHCl$_2$). BCl$_3$ and Na A boron-containing PMS was prepared from 9.3 g Na, 20.6 mL MeHSiCl$_2$, 10 wt. % 1,2-dichloroethane with respect to MeHSiCl$_2$, and 1.6 mL 1 M BCl$_3$ in heptane (0.2 mol % based on MeHSiCl$_2$). The sodium metal was purified and made into small particles as in the previous example.

The MeHSiI$_2$ was added slowly to the sodium containing mixture, and following addition, the mixture was stirred for 2.5 h at 80° C. then cooled to 0° C. and BCl$_3$ added slowly. The mixture was stirred for 2 h then heated to 80° C. again for 1.5 h. An 85/15 mL toluene/THF mixture was used as the solvent system.

In these reactions, the polymer yields are higher then those of the prior art processes, the molecular weights are higher (in some instances double), and the ceramic yields are considerably higher. Furthermore, the optimal reaction conditions require only 4 hours of reaction time (vs 20 hours in hexane/THF). Further improvements may be possible, as the processes have not been optimized.

Figure 3:
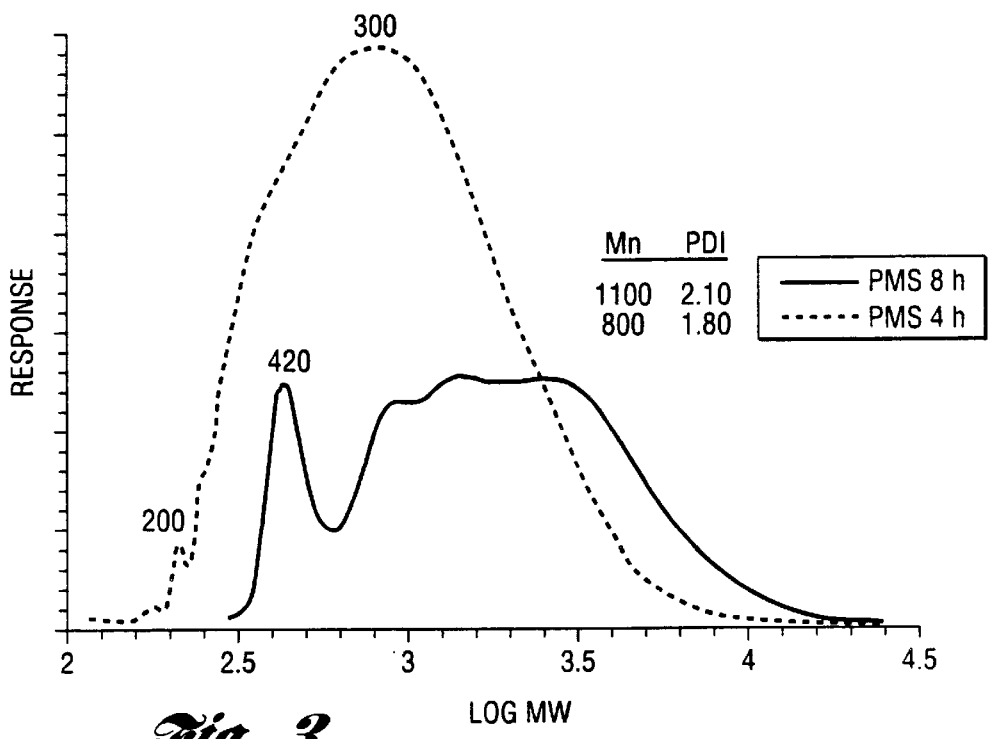
FIG. 3. SEC comparison of PMS-4 h and PMS-8h. MW's are based on polystyrene standards.

A comparison of an 8 h reaction in accordance with Example 1 with a 4 hour reaction by the FIG. 3 SEC. The 4 hour reaction gives a uniform, moderate dispersity polymer. The 8 h reaction product is bimodal with a lower MW peak at 420 Da that may correspond to a 10 member cyclic compound and higher MW materials. This polymer is less uniform than the 4 h material and is stable to further reaction, see below. Based on mass spectral evidence including isotope analysis, and a $_1$H NMR integration ratio of 4.5:1, structures can be suggested for a higher molecular weight species clearly identified by mass spec. Note that these structures are hyperbranched themselves.

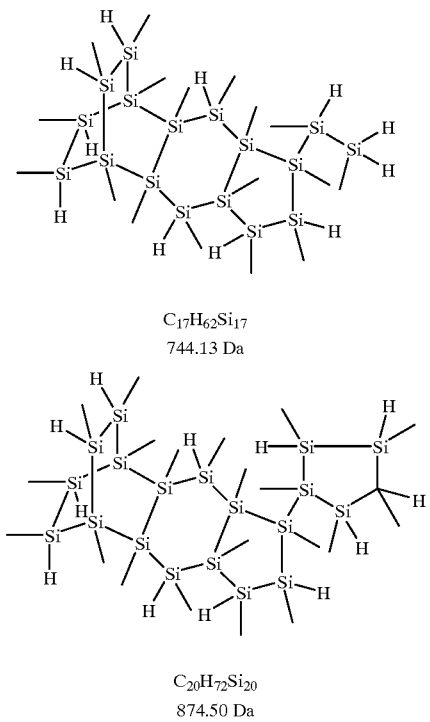

$C_{17}H_{62}Si_{17}$
744.13 Da $C_{20}H_{72}Si_{20}$
874.50 Da

Although other structures can be suggested, the low number of Si-H bonds and the few SiH2 moieties strongly favors the formation of not only joined rings but in particular cage structures. These structures provide the very low oxygen sensitivity found for these materials. Furthermore, the limited number of $SiH_2$ groups means that these groups or related SiHCl groups may be used to join this oligomer to the TVSB structure created above, to increase the MW of the hyperbranched material without worrying about coincident crosslinking leading to an insoluble polymer.

Given the chlorine content of the PMS produced herein, the only catalytic route to forming the last part of the hyperbranched polymer is via transition metal catalysts that are not susceptible to chlorine poisoning. This includes typical hydrosilylation catalysts, e.g. $H_2PtCl_6$; Karstedt's catalyst, which is preferred; Pt/C, etc. The $H_2PtCl_6$ catalyst is not particularly useful because this catalyst can catalyze Si-Si bond cleavage to generate significant numbers of Si-Cl bonds. Although, Si-Cl bonds already are present in the PMS, more are very undesirable because they can seriously reduce molecular weight. Those skilled in the art will be able to choose from these or other appropriate catalysts. Chlorinated compounds frequently limit the efficacity of radical polymerization agents (promote chain transfer); thus, subject materials would not be particularly amenable to radical promoted reactions such as those disclosed in prior art methods of increasing molecular weight.

Figure 4:
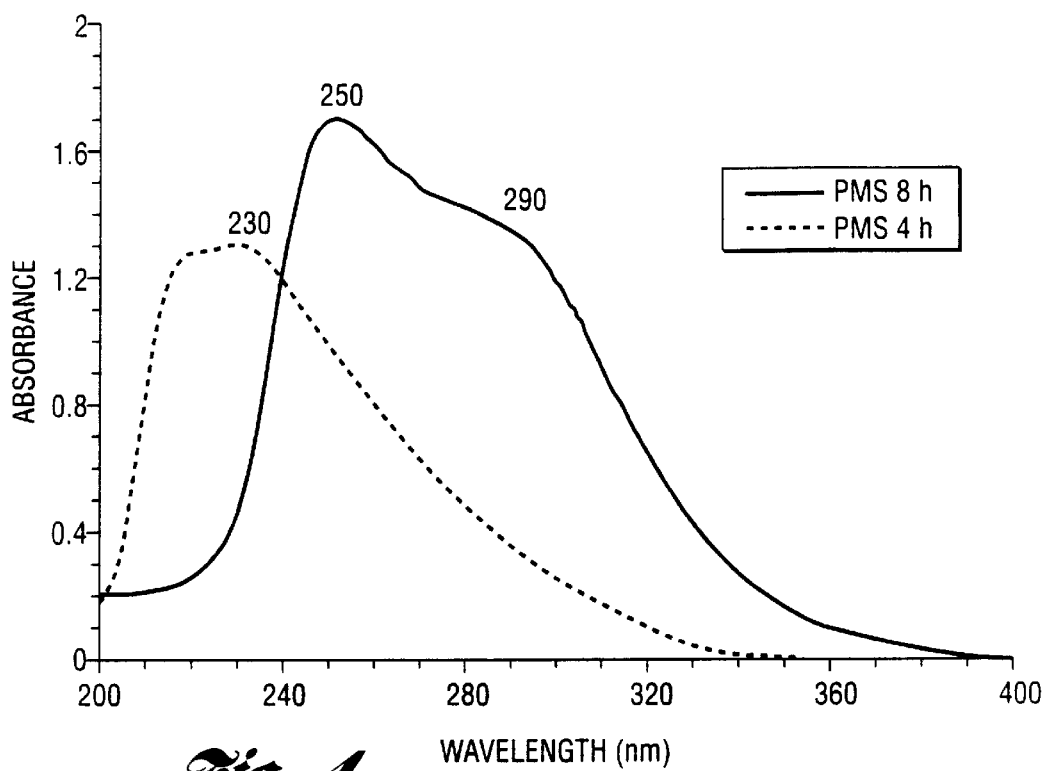
FIG. 4. UV and Visable Adsorption of PMS compounds.

FIG. 4 indicates that both PMS-4 h and 8 h exhibit significant UV adsorption and are therefore susceptible to UV or blue light crosslinking. In essence it means that without modification these compounds can be used for lithography processes where SiC and hydrogenated SiC would be used for electronic applications. Note that hydrogenated SiC is a common photovoltaic. Alternately, both could be used for rapid prototyping[51] either in solution or as a melt. Even after conversion to mPMS (see below) these materials would be expected to be useful for lithography, rapid prototyping, photovoltaics and for high temperature semiconductor applications.

A typical coupling reaction between TVSB and PMS-4 h is shown as follows, but for those versed in the art, it is obvious that these reaction conditions are not meant to be limiting.

Synthesis of PMS+TVSB in the Presence of Platinumdivinyl Tetramethyldisiloxane [Pt(dvs)]

PMS-Cl from the above described reaction (Example 1) ($\approx$10 g solids) as an 8% solution is heated to 100° C. under argon in a 500 mL Schlenk flask equipped with condenser and stir bar. TVSB as a 35% solution in THF from the above reaction (1.0 g solids) (w/w ratio of PMS/TVS is $\approx$10/1) is added to the PMS with stirring. Pt(dvs) [Karstedt's catalyst] (0.7 mL of a 2.0 mmol solution in toluene, 4 ppm per Si-H) is added and the solution is stirred for 4 h. The pale yellow PMS/TVSB/Pt solution is cooled to room temperature and stored under argon. $_1$H-NMR ($C_6D_6$) $\delta$3.93 (br, 1.0H, SiH, $SiH_2$) , 0.43 (br, 6.1H, $SiCH_3$). $_{13}$C NMR ($C_6D_6$) $\delta$–9.3 (br, $SiCH_3$). $^{29}$Si NMR ($C_6D_6$) $\delta$–61.9, –64.9 (narrow, $SiSiH_2$, endgroup), –67 →–70 (br, $Si_2SiH$, main chain), –66→–74 (b, $Si_3Si$, branch point) ppm. IR 2957 m, 2894 m, 2796 w, 2084 s, 1409 m, 1248 m, 1048 w, 932 m, 866 s, 770 s, 685 s, 641 s cm-1. SEC; Mn=1970 g/mol, Mw=12800 g/mol, PDI=6.52. TGA (N2); 75–85 wt. % (exp.), 90.9 wt. % (calc.).

Figure 5:
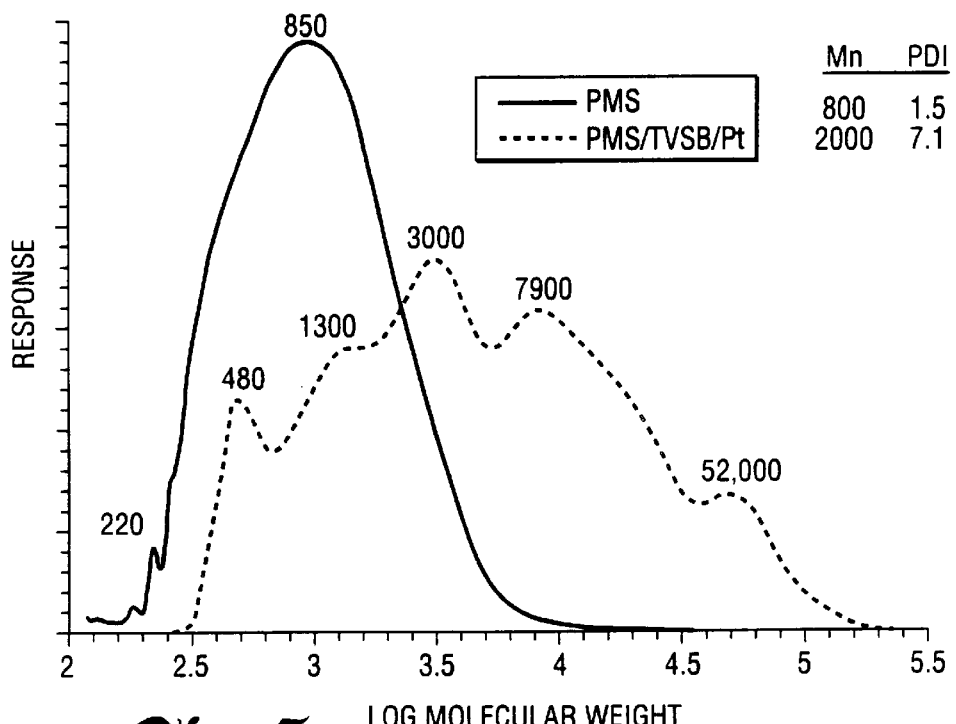
FIG. 5. Comparison of starting PMS-4 h MW profile to the TVSB-PMS-4 h profile. Note the major fraction of polymer MW >10,000 Da which is important in providing good rheological properties.
Figure 6:
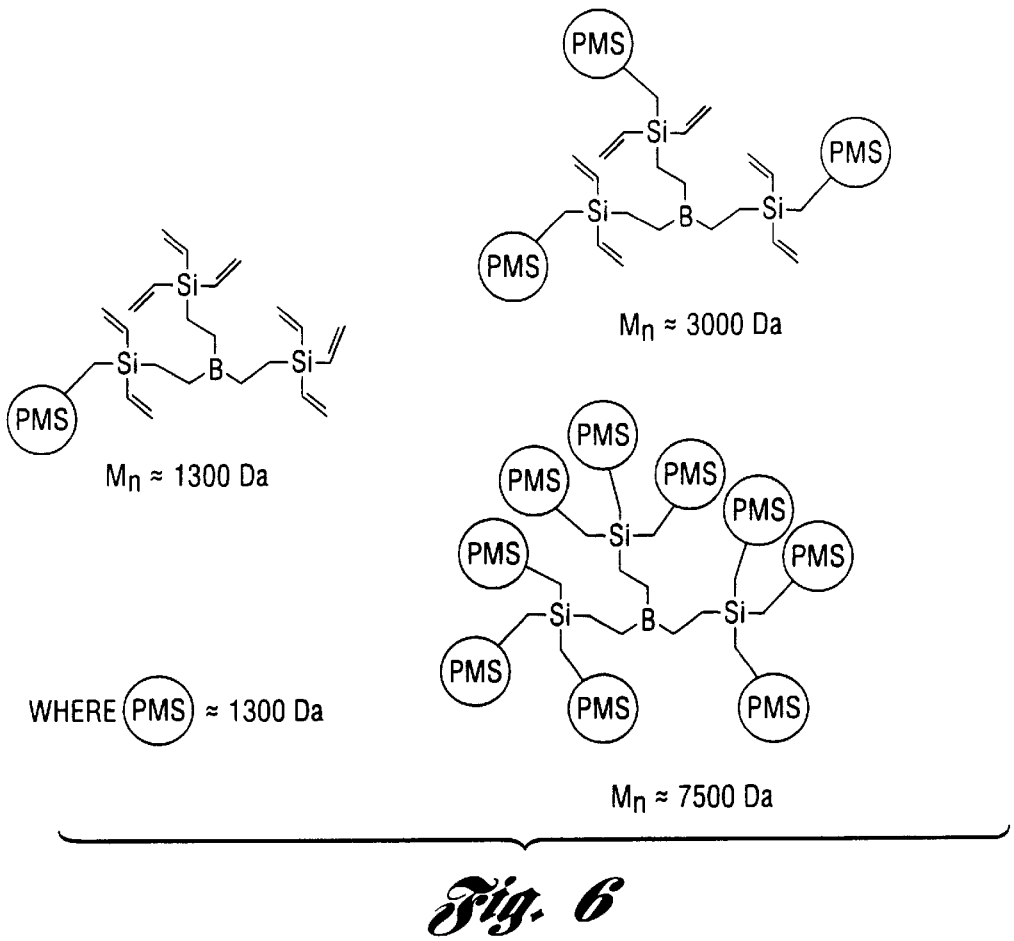
FIG. 6. Illustrates possible structures of hyperbranched, boron-containing TVSB-PMS SiC precursors.

The SEC shown in FIG. 5 illustrates the hyperbranching that occurs during reaction. If any Si-H group on PMS-4 h can react with TVSB vinyl groups, then a highly crosslinked, insoluble polymer would be anticipated. If extensive crosslinking did not occur, but attachment were still indiscriminant, then a broad envelope of species would be anticipated. However, a very well defined series of maxima in the SEC are observed. These are expected if only a few $SiH_2$ (and or SiClH) groups are present on PMS 4 h and only these react selectively with the TVSB. Thus, in general, only one PMS-4h molecule would react per vinyl group. At most then, PMS-4 h molecules would react one additional time to connect two smaller hyperbranched units—leading to the higher molecular weights while retaining solubility. Clearly, there is significant structural order in this precursor that is not seen in any other precursor. Furthermore, this order aids in processability and in control of microstructure as shown below. The structures shown in FIG. 6 suggest possible arrangements of PMS-4 h around TVSB molecules and the resulting MWs:

These structures are quite different and the air sensitivity of TBSB-PMS-4 h (mPMS) is much less than all other known hydridosilane precursors, except polysilaethylene, which cannot be spun into fibers.

Figure 7:
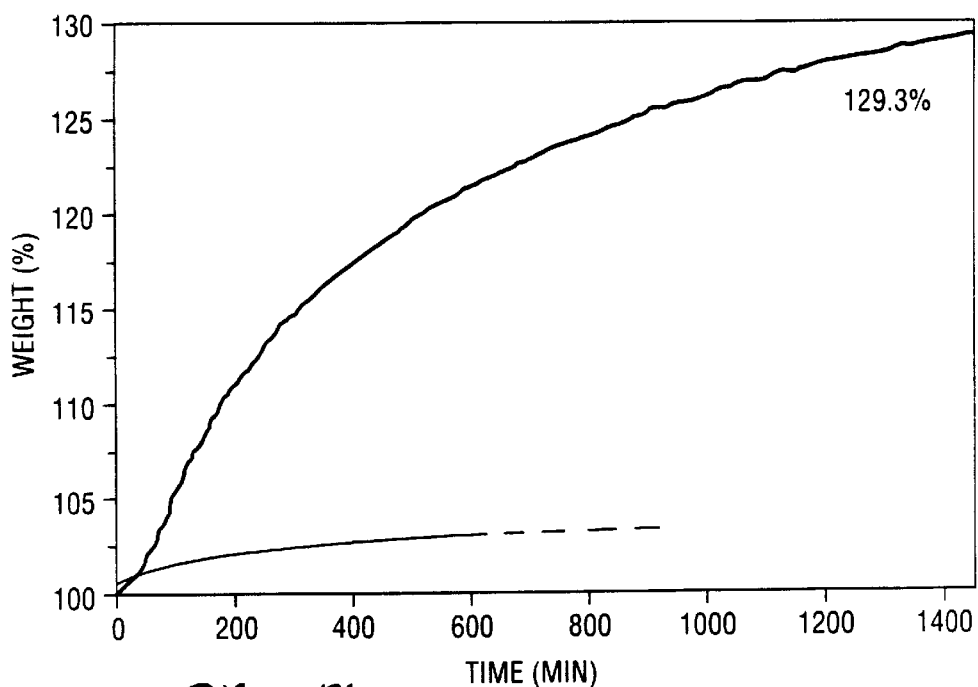
FIG. 7. Air stability of mPMS. Curve A is PMS, prepared by prior art processes. Curve B is TVSB-PMS prepared in accordance with the subject invention.

In FIG. 7, the original TVSB-PMS (curve A) gains 15–20 wt % in ambient air after 5 h whereas here (Curve B) the weight gain is only 3 wt. %. Furthermore, mPMS does not ignite spontaneously in air and can be handled briefly in air. The new structure and reduced reactivity may be due to minimization of the total number of $SiH_2$ groups in PMS. Note that PMS-8 will not react at all with TVSB as almost no $SiH_2$ groups remain following this reaction period, as determined by $^1$H NMR. By the term "substantially non-pyrophoric" is meant that the products may be handled at ambient temperatures in air without being spontaneously flammable.

Fibers spun from mPMS are self-curing and on pyrolysis to 1800° C. give phase pure, fully dense (>3.1 g/cm$^3$) SiC fibers with controlled microstructures (crystallite sizes range from 0.3–0.5 µm. When subjected to bend stress analyses, these fibers exhibit bend strengths of ≈3 GPa with an estimated elastic modulus >400 GPa. Furthermore, mPMS with $M_n \approx 2000$ Da and $M_w \approx 7,000$ Da can also be used for: (1) for polymer infiltration and pyrolysis processing of ceramic powder and ceramic fiber reinforced matrices, (2) joining ceramic parts, and (3) for coating other inorganic materials, e.g. carbon fibers.

For the residual chlorine-containing PMS of the present invention, molecular weights may be adjusted by varying the reaction time, amount of dehalocoupling agent, and potentially other variables. Chain stoppers, e.g. $(CH_3)_3SiCl$ or $(CH_3)_2HSiCl$ may be added in small quantities to reduce molecular weight. The desired molecular weight will be dictated in part by the end use of the SiC precursor, as molecular weight and the degree of branching both affect polymer rheology, as indicated previously. Since higher molecular weights generally result in increased ceramic yield, number average molecular weights greater than 700, preferably greater than 800, and more preferably greater than 1000 Da are desired for PMS. Polydispersities of greater than 2.0 and preferably greater than 4.0 are desired for fiber applications, as the still significant amount of high molecular weight fractions having molecular weights greater than 10,000 contributes to useful rheology. For infiltration applications, the lower viscosities associated with a narrower molecular weight distribution may be desirable.

For Group IIIa metal-containing hyperbranched structures, a lower molecular weight PMS is useful, as the linking of PMS molecules at branch sites increases molecular weight of the product molecules significantly. For such product molecules, number average molecular weights greater than 1000 Da are preferred, with molecular weights in the range of 1500 Da and higher, preferably 1500 Da to 4000 Da being preferred. For useful spinning rheology, it is necessary that the molecular weight and branching be such that the polymer is a liquid, or is soluble in a spinning solvent.

The following are provided as examples of the utility of mPMS.

Ceramic Matrix Composites. Ceramic matrix composites (CMCs) have many desirable properties at high temperatures (>700° C.) that are rarely matched by other materials systems, especially monolithic ceramic analogs. These include high strength and stiffness, chemical inertness and a relatively low density compared to pure metals/alloys.

CMCs are superior to monoliths because many toughening mechanisms are available to inhibit crack propagation/brittle failure that are not found in monoliths. Examples include compressive prestressing, directed load transfer from low modulus matrix to high modulus reinforcement, interfacial delamination—crack deflection around impenetrable barriers, microcrack formation and crack bridging. These toughening mechanisms allow the CMC to fail "gracefully" instead of catastrophically.

CMCs are processed using a wide range of fabrication methods including chemical vapor deposition (CVD), chemical vapor infiltration (CVI), melt infiltration, hot pressing, sol-gel, in-situ reaction, and polymer impregnation and pyrolysis (PIP). Each method has its own set of limitations and requirements. For instance, CVD can be used to produce dense monolithic structures, but is time intensive, and complex shapes that are non-axially symmetric are difficult to produce because line-of-sight deposition is often required. Also, the significant danger in working with highly combustible (often toxic) gases under extreme conditions and the high equipment costs are major deterrents to widespread use in CMC fabrication.

Sol-gel and PIP processing of CMCs requires lower processing temperatures, allows for atomic mixing and hence greater chemical homogeneity, and is usually relatively inexpensive. The major disadvantages to sol-gel processing are slow gel formation rates, high volume shrinkage, and low yield. The high volume change frequently result in the formation of multiple cracks in the CMCs. Sol-gel approaches are also typically good only for oxide precursors as water is frequently one of the reactants.

CMCs from PIP Process. PIP processing is a potentially excellent method for fabricating CMCs. In PIP processing as practiced here, capillary action is used to introduce a solution of PMS (10 to 15 wt % PMS in toluene/THF—not meant to be constraining) into the CMCs. As a result, PMS is deposited onto the "walls" of the pores. After heat treatment, the PMS densities and collapses, forming a pipe-like layer and partially filling the pore. Thus, PMS derived β-SiC will cover exposed CMC particle surfaces.

Three types of composite disks were made: (1) pure AlN with mPMS binder, (2) AlN/α-SiC with mPMS binder, and (3) AlN/α-SiC without mPMS binder. Disks fabricated from pure AlN had insufficient green body strength and exhibited shear failure; pure AlN with mPMS binder compacts could be easily pressed but were weak after heat treatments, and surface cracks were visible. AlN/α-SiC composite disks fabricated using a 9:1 (wt:wt) ratio powder mixtures provided good green strength and ease of handling. Note that the ratio of powders used was not optimized. α-SiC was used as a reinforcement: (1) because the AlN/α-SiC mixtures with mPMS demonstrated the best handling characteristics, and (2) to minimize confusion with polymer-derived β-SiC.

Pure AlN Compacts with mPMS Binder, and AlN/α-SiC Compacts with mPMS Binder. All operations were carried out in an Ar glove box (MO-40-2 Dri-Lab glove box, Vacuum Atmospheres, Hawthorne, Calif.). Dilute mPMS (≈12 wt. % polymer in toluene) was added to pure AlN to obtain a 3:1 and 1:3 (wt:wt) AlN:PMS composition after vacuum removal of solvent. A 9:1 (wt:wt) AlN/α-SiC powder mixture was mixed thoroughly, then dilute mPMS was added to obtain a composition of (AlN/α-SiC)1-x(PMS)x after vacuum removal of solvent, where x=10, 20, 25 or 30 wt. %

The dried powder/binder mixture (typically ≈0.4 g) was then carefully poured into a double-action stainless steel die (12.72 mm ID, 50.8 mm height). The assembled die was removed from the glove box and uniaxially compressed to 20 ksi (Carver Laboratory Press Model C, Wabash, Ind.). The compressive load was removed after the pressure had stabilized for ≧5 mins and the disk ejected from the die under a protective inert atmosphere (typically $N_2$).

The disks (12.72 mm D by ≈1.9 mm H) were rapidly transferred onto graphite foil lined alumina holders inside a sealed and ported quartz furnace tube for heat treatment. The quartz tube was purged with Ar for 10 min and then heated at 10° C./min/Ar to 1000° C. to convert the mPMS to β-SiC (SiCmPMS). After heat treatment, the quartz tube was returned to the glove box following three degassing steps in the antechamber. The disk dimensions and weight were noted; with digital calipers (CD-6" C, Mitutoyo Corp., Japan) and Mettler balance (PJ360 DeltaRange®, Highstown, N.J.).

AlN/α-SiC Compacts Without mPMS Binder. A 9:1 (wt:wt) ratio powder mixture was first mixed thoroughly in air (≈15 mins) and then ultrasonicated for 10 mins (Bransonic Ultrasonic Cleaner, Model 1200, Danbury, Conn.). The powder mixture (typically ≈0.4 g) was then carefully poured into a double action 316 stainless steel die in air and uniaxially compressed as described above. The compressive load was removed after the pressure had stabilized for ≧5 mins and the disk ejected from the die.

The disks (12.72 mm dia. by ≈1.9 mm H) were degassed overnight to remove physisorbed air from the internal capillaries and surfaces of the specimens. This was done by placing the disks under medium vacuum (<1 Torr) in the antechamber of an argon glove box. The disks were then transferred into the glove box, placed on graphite foil lined alumina boats (6.0 cm×3.0 cm'1.4 cm) inside a sealed and ported quartz furnace tube before removal from the glove box for heat treatment. The quartz tube was heated at 10° C./min/Ar to remove any adsorbed water, surface coatings or organics introduced during sample preparation. After heat treatment, the quartz tube was resealed and returned to the glove box. The disk dimensions were recorded as described above.

Polymer Infiltration and Pyrolysis Process (PIP). The disks (with and without SiC) were immersed for 12 h in tightly capped vials (13.5 mm ID by 85 mm H) filled with dilute mPMS. The disks were removed from the vials, dried, placed in a quartz tube and transferred to a furnace. The heating schedule was developed from the weight loss behavior of pure mPMS polymer, obtained from TGA data. Sample weight and dimensions were recorded after each heat treatment before the disks were gently polished with 900 grit SiC polishing paper (Mager Scientific, Dexter, Miss.). The disks were then reimpregnated with mPMS solution as described above, and the pyrolysis was repeated.

Two different furnace heating schedules were used. The original (Table 1) program required 12 h for completion, and was used to avoid damaging the relatively weak green compacts. Subsequent pyrolysis programs used the second schedule, with the heating ramp rates doubled.

Two improvements were incorporated to ensure maximum polymer infiltration into the disks. The first involved gently polishing the sample surfaces after each pyrolysis step to remove the thin SiCmPMS coating following each PIP cycle. Unless removed, this coating caused poor infiltration behavior in subsequent cycles. The second approach was to use higher heat treatment temperatures (1200°, 1400° C.) to densify the SiCmPMS, thereby reopening SiCmPMS-filled pores. This densification was inferred as infiltration behavior was improved even though mass and bulk volume did not change. Additional polymer infiltration thus becomes possible.

XRD analyses of mPMS heated at 1000° to 1400° C. show that the product is β-SiC phase FIG. 13. Note that in FIG. 13, the ratios of PMS-4 to TVSB were varied between 8, 10 and 12 wt. % TVSB to produce, Si rich, stoichiometric and carbon rich ceramic product. The mPMS used here is the 12 wt. %, as the excess carbon counteracts the oxide coating on the powder particulates used as reinforcement. Very broad, moderate intensity peaks are obtained for 1000° C. samples, suggesting material formed at this temperature was nanocrystalline. Further, peak sharpening, indicating grain growth, was observed in samples heat treated at 1200° and 1400° C. However, the peaks remains broad even after 1400° C. indicating that the material is noncrystalline. These observations were supported by TEM and NMR studies. The average grain sizes (from TEM observations) of the SiC material produced were ≈1 nm (1000° C.), 10 nm (1200° C.), 25 nm (1400° C.), 60 nm (1600° C.), and 200 nm (1800° C.).

PIP Processing Infiltration Studies/Density Changes. Initial studies with 3 h sample immersion times in mPMS were found insufficient for complete infiltration. Consequently, infiltration immersion times were extended to 12 h, and resulted in improved weight gains. Bubble streams, occasionally obscuring the sample completely, appeared immediately upon immersion. The rate at which bubbles formed then decreased, slowly for the first few PIP (4) cycles, but rapidly beyond that.

The density gain gradient from mPMS uptake with number of PIP cycles was similar in all samples, relative to the green density, with or without mPMS binder and/or α-SiC particles. This result is significant because the observed sintering in samples with mPMS binder apparently does not hinder subsequent infiltration efforts.

This implies that the sintering is not accompanied by significant amount of pore closure, perhaps prevented by the gases evolved during mPMS conversion to SiC. Because samples with mPMS binder have higher "green" densities, fewer PIP cycles were required to achieve higher densities. Moreover, the maximum densities possible were also higher with mPMS binder. For example, the maximum densities possible for mPMS binderless disks were ≈2.1 g/cm$^3$ after 9 PIP cycles and 1400° C. heat treatments. In comparison, the highest densities obtained for samples with 20 wt. % mPMS binder after 9 PIP cycles was ≈2.5 g/cm$^3$.

The above densities were obtainable, within the acceptable 10 PIP cycles, only by using a staged heating schedule designed for maximum mPMS introduction. Zhang et al. showed that the SiC mPMS density increases with higher heat treatment temperatures, and approaches full density (3.21 g/cm$^3$) only at ≈1800° C. The use of low-temperature processing conditions (s 1200° C., which result in SiC-mPMS with π<2.4 g/cm$^3$) with minimal use of 1400° C. heat treatments to obtain the maximum possible densities in a minimum number of steps are preferable. Therefore, disks were first PIP cycled at 1000° C. until no density gains were observed (typically 3 or 4 cycles). Higher final cycle temperatures (1200° and 1400° C.) were then used to aid SiCmPMS densification and reopen capillary pores. Further 1000° C. PIP cycles were then carried out.

The advantages of repeated PIP cycling at 1000° C. include shorter processing times and minimum use of high temperature. Reduced processing times are obtained because slow heating rates are used only until the polymer-to-ceramic conversion (≈1000° C.) has occurred, to avoid excessively rapid gas formation and release, which could damage the composites. Subsequent heating programs to promote SiCmPMS sintering can be performed at much faster rates (up to 25° C./min to 1400° C.), which reduce grain growth, as samples are exposed to high temperature for shorter periods of time.

Samples were heat treat at 1400° C./1 h/Ar, when no densification occurred after 1200° C. heat treatments. Sample densities were unaffected (no mass loss and bulk volume change) by the 1400° C. treatment. PIP processing usually ended here, even though further PIP cycles were possible after the 1400° C. treatment, as the 10 cycles limit had been reached. However, the densities obtained (≈2.5 g/cm$_3$) are still insufficient for the applications targeted. Therefore, further improvements are required to achieve denser samples within the preset 10 PIP cycles limit.

The structural similarity between AlN and α-SiC suggests that AlN may seed SiCmPMS crystallization. This possibility was tested by mixing submicron AlN powder and mPMS in a 3:1 (wt:wt) ratio, and heating the mixture to different temperatures. The resulting material was characterized by both XRD and DRIFTS. The predicted and actual weight losses for these mixtures were within 1%, after 1000° C. heat treatment. For example, the actual weight was 0.350 g, while the predicted weight was 0.351 g, assuming an 85 wt. % CY for mPMS at 1000° C. No further weight loss was detected between 1000° to 1400° C., although a weight loss of ≈0.005 g was expected based on mPMS behavior on heating to 1400° C.

XRD analyses of the mixed and pyrolyzed material show only sharp AlN peaks, with no changes observable even at 1400° C. Further testing was performed with a 1:4 (wt:wt) AlN/mPMS mixture. XRD analyses of these mixtures heated to 1200° and 1400° C. suggest that SiCmPMS does not nucleate on AlN particles. Enhancement of the (002) AlN peak, 36.04° (2θ), is attributed to contributions from the broad (111) β-SiC peak, at 35.66° (2θ). The graphite C peaks that normally form with mPMS are missing, most likely from reaction with surface oxygen on AlN particles.

Figure 8:
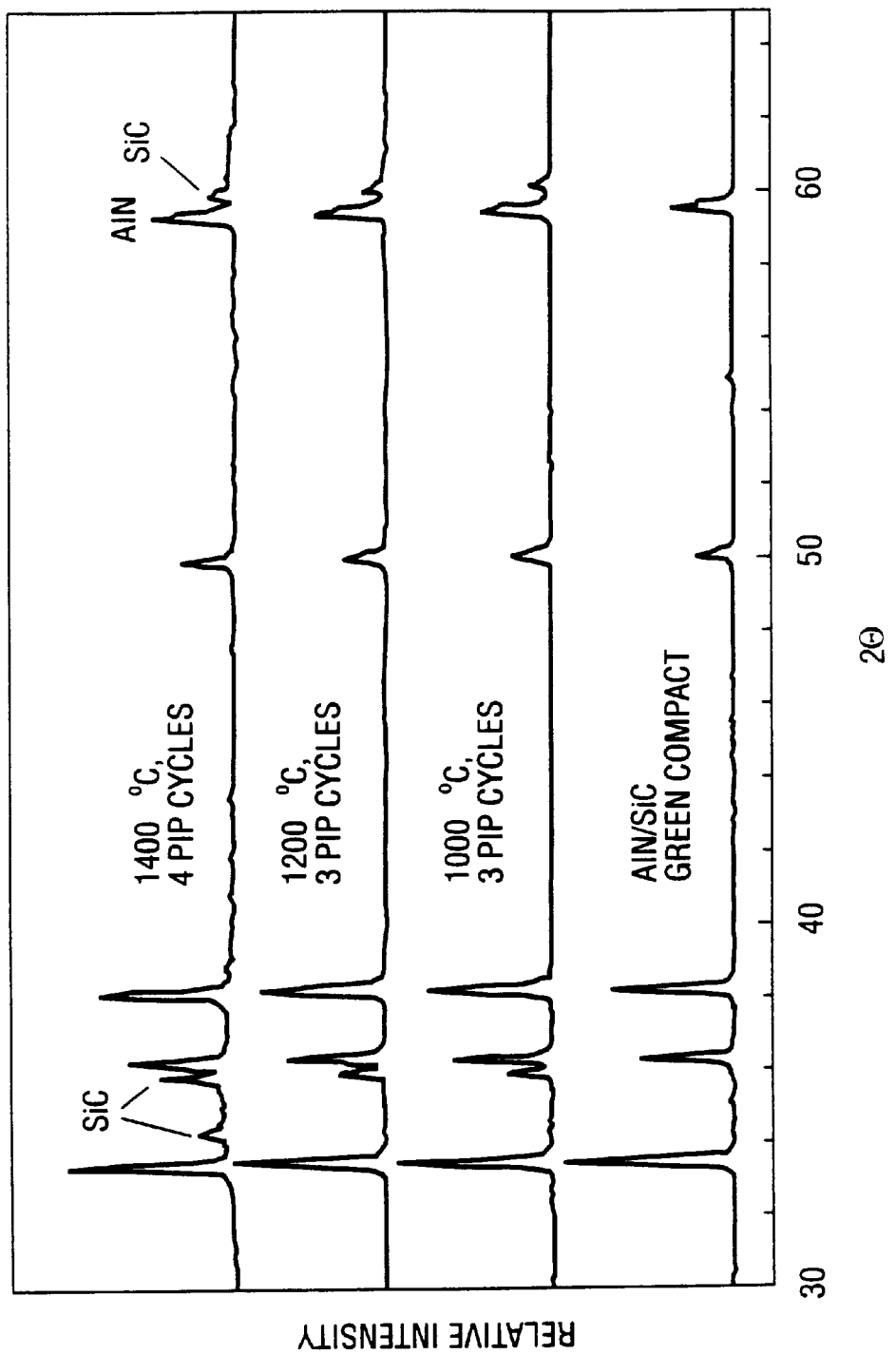
FIG. 8. Stacked XRDs of AlN/α-SiC disks showing evolution of SiCmPMS after different stages of PIP processing. The temperatures and the number of PIP cycles shown indicate the maximum heat treatment used and the cumulative total of cycles.

The effect of small α-SiC additions to the AlN/mPMS system was also studied, especially for seeding SiCmPMS crystallization. XRDs of pyrolyzed AlN/α-SiC disks infiltrated with mPMS suggest that preferential crystallization of SiC occurs, as illustrated in FIG. 8. The lowest XRD patterns were using an as-pressed AlN/α-SiC disk, without any mPMS binder or before PIP cycles, and a single disk with mPMS binder, after different processing stages (3 PIP cycles at 1000° C., followed by heat treatment at 1200° C., and finally after 1 additional PIP cycle and 1400° C. heat treatment).

No SiC peaks are present in the as-pressed disk despite the 10 wt. % α-SiC content. Two new peaks, from β-SiC [(111) at 35.60° 2θ and (220) at 59.980 2θ] appear in the XRD patterns after three 1000° C. PIP cycles. The presence of the (101) peak for 6H α-SiC (34.09° 2θ, 35% of most intense peak, JCPDS file number 29-1128) is used to distinguish between the α and β phase. The enhanced intensity and narrow β-SiC peaks seen indicate greater crystallinity than normally found for SiCmPMS, which usually remains nanocrystalline even at 1400° C. No changes were observed in the XRD pattern when the same disk was heated to 1200° C., without any additional PIP cycles (third pattern from bottom). However, significant changes were detected in the sample after a fourth 1000° C. PIP cycle followed immediately by heating to 1400° C. The (101) peak for 6H α-SiC (34.09° 2θ) is now present (top pattern), while the SiC peak at 35.6° 2θ increases slightly, with reference to the AlN peak at 36.04° 2θ. The conclusion reached from these studies is that α-SiC seeds the crystallization of β-SiC. Because the crystallization of β-SiC from mPMS at 1000°–1200° C. occurs, this means that it is no longer necessary to heat precursor derived matrices to 1800° C. to achieve full density. This is the first example of seeding reported, and has tremendous consequences on the need to go to 1800° C. to achieve the relevant properties. This is unique for precursor derived materials.

The data presented above indicates that addition of seed crystals, for example of α- or β-SiC, may be used to initiate crystal growth at temperatures far lower than the high temperatures generally necessary, i.e. temperatures of 1800° C. or more. Because crystal growth may occur at lower temperatures, significant cost savings in processing may be realized, as high pyrolysis/sintering temperatures form a large part of fiber processing cost.

Moreover, the ability to seed crystal growth allows further diversification in product forms. For example, by incorporating relatively large numbers of seed crystals into the green body, a polycrystalline morphology may be created. Furthermore, the size of the crystallites may be altered by increasing or decreasing the number of seed crystals introduced. Perhaps the most exciting use of the seed crystal approach is to generate crystal growth from a single seed crystal or surface such that the resulting product is a single crystal. Single crystal silicon carbide may be exceptionally useful in high temperature applications, particularly those in the electronic field. Single crystal silicon carbide may serve as a semiconductor substrate, for example, or in doped or undoped form as an active semiconductor or electronic sensor.

In order to grow single crystal silicon carbide, a single SiC seed crystal surface must be provided to the SiC precursor, this surface located at or near one boundary of the precursor green body. The green body is then brought to a temperature at which crystal growth begins, a temperature gradient being established such that the portion of the green body closest the seed crystal first experiences the minimum crystal growth temperature. As the crystal grows, the temperature of the green body is allowed to increase along the crystal boundary, until the entire crystal has been formed. This gradient may be established by supplying heat from only one direction in the green body, i.e. from the seed crystal direction, or may smoothly progress from one end of the green body to the other, similar to a zone refining furnace as used in semiconductor refining.

The minimum grain growth temperature is generally less than 1400° C, in contrast to the 1800° C. normally expected. However, the preceding experiments illustrate that significant crystal growth occurs at 1000° C. to 1200° C., and it is believed that crystal growth may be significant at temperatures as low as 700° C. The actual temperature will be dependent on the particular PMS utilized, as well as the nature and degree of impurities and dopants. The crystals formed have controlled polytype and growth direction.

Because the PMS precursors of the subject invention are liquids or are solvent-soluble, and are photolytically curable, they may be used for photolithography and rapid prototyping. This is particularly true of the hyperbranched TVSB-derived PMS precursors which can be photocured due to the presence of free ethylenic or ethylynic unsaturation. The photocuring may be accelerated by addition of conventional photocuring catalysts. Both photolithography and rapid prototyping processes are by now well known. In such processes, a substrate is immersed in photocurable liquid to form a uniformly thick curable film. The film is then cured, either by exposure to UV light, electron beam, etc., through a mask, or preferably by computer controlled scanning with a UV laser. The cured layer thus created is coated with an additional layer of curable liquid and reexposed. Each layer may be quite thin, and the pattern may change from layer to layer, creating a three-dimensional green body which may subsequently be fired to produce a three-dimensional SiC part.

References

1. R. M. Laine and A. Sellinger, "Si Containing Ceramic Precursors," in *The Chemistry of Organic Silicon Compounds*, Z. Rappoport and Y. Apeloig, eds., J. Wiley and Sons, London, in press.

2. R. M. Laine, F. Babonneau, "Preceramic Polymer Routes to SiC," CHEM. MAT. 5, 260–279 (1993).

3. C. D. Han, *Rheology in Polymer Processing,* ACADEMIC PRESS, N.Y., N.Y., 1976.

4. A. Ziabicki, *Fundamentals of Fiber Formation,* J. Wiley, N.Y., N.Y., 1976.

5. P. Calvert, M. J. Cima, J. AM. CERAM. Soc. 73, 575 (1990).

6. M. J. Cima, J. A. Lewis, A. D. Devoe, J. AM. CERAM. SOC. 72, 1192 (1989).

7. M. Scarlete, J. He, J. F. Harrod, I. S. Butler in *Applications of Organometallic Chemistry in the Preparation and Processing of Advanced Materials,* NATO ASI Seri. E: Appl. Sci.-Vol. 297, J. F. Harrod, R. M. Laine Ed.; Kluwer Publ., Dordrecht, 1995, pp. 125–140 and references therein.

8. Z-F. Zhang, S. Scotto, R. M. Laine, "Pure silicon carbide fibers from polymethylsilane," CERAM. ENG. SCI. PROC., 15, 152–61 (1994).

9. R. M. Laine, F. Babonneau, K. Y. Blohowiak, R. A. Kennish, J. A. Rahn, K. F. Waldner, G. J. Exarhos, "Pyrolysis of Poly(N-methylsilazane): Amorphous Silicon Nitride/Carbon Composites from a Polymer Precursor," J. AM. CERAM. SOC. 78, 137–45 (1995).

10. A. M. Birot, J-P Pillot, J. Dunogues, CHEM. REV. 1443–77 (1995). b. K. J. Wynne, R. W. Rice, ANNU. REV. MATER. Sci. 14, 297, (1984). c. R. R. Wills, R. A. Markle, S. P. Mukherjee, "Siloxanes, Silanes, and Silazanes in the Preparation of Ceramics and Glasses", CERAM. BULL. 62, 904–15 (1983). d. R. H. Baney, G. Chandra, in *Ency. of Polymer Sci. and Eng.,* J. Wiley and Sons, N.Y.N.Y., (1988) vol. 13, pp. 312–44. e. J. Bill, F. Aldinger, ADV. MATER. 7, 775–87 (1995). f. W. Toreki, "Polymeric Precursors to Ceramics—A Review," POLYM. NEWS 16, 6–14 (1991). g. G. Pouskouleli, Metallorganic Compounds as Preceramic Materials. I. Non-oxide Ceramics," CERAM.INT. 15, 213–29 (1989).

11. R. M. Laine, Z.-F. Zhang, K. W. Chew, M. Kannisto, C. Scotto, "Synthesis and Processing of Silicon Carbide Fibers: State-of-the Art," in CERAMIC PROCESSING SCIENCE AND TECHNOLOGY, Publ. Am. Ceram. Soc., Westerville, OH, (1995) pp. 179–186. H. Hausneer, G. Messing, S. Hirano, eds.

12. A. S. Yajima, K. Okamura, J. Hayashi (1975), "Structural analysis in continuous silicon carbide fiber of high tensile strength," CHEM. LETT. 1209. b. S. Yajima, M. Omori, J. Hayashi, K. Okamura, T. Matsuzawa, and C.-F Liaw 91976), "Simple synthesis of the continuous SiC Fiber with high tensile strength," CHEM. LETT. 551. C. S. Yajima, h. Kayano, K. Okamura, M. Omori, J. Hayashi, T. Matsuzawa and K. Akutsu, "Elevated Strength of Continuous SiC Fibers," J. AM. CERAM. Soc. 55, 1065 (1976).

13. A. S. Yajima, K. Okamura, J. Hayashi, M. Omori, "Synthesis of continuous SiC Fiber with high tensile strength," J. AM. CERAM. Soc. 59, 324 (1976). b. S. Yajima, J. Hayashi, M. Omori, K. Okamura, "Development of a silicon carbide fiber with high tensile strength," NATURE 261, 683 (1976). c. S. Yajima, T. Shishido, H. Kayano, "Development of high tensile strength silicon carbide fibre using an organosilicon polymer," NATURE 273, 525 (1978).

14. A. S. Yajima, Y. Hasegawa, J. Hayashi, M. Iimura, "Synthesis of continuous silicon carbide fibre with high tensile strength and high Young's modulus," J. MATER. Sci. 13, 2569 (1978). b. Y. Hasegawa, M. Iimura, S. Yajima, "Synthesis of continuous silicon carbide fibre, Part 2" J. MATER. Sci. 15, 720 (1980). c. Y. Hasegawa and K. Okamura, "Synthesis of continuous silicon carbide fibre, Part 3," J. MATER SCI. 18, 3633 (1980).

15. T. Yamamura, T. Ishikawa, M. Shibuya, T. Hisayuki, "Development of a new continuous Si-Ti-C-O fibre using an organometallic polymer precursor," J. MAT. Sci. 23, 2589 (1988).

16. Y. C. Song, Y. Hasegawa, S.-J. Yang, M. Sato, "Ceramic fibers from polymer precursor containing Si-O-Ti bonds," Part 1. J. MAT. Sci. 23, 1911 (1988).

17. T. Yammura, "Development of a new continuous Si-Ti-C-O fibre using an organometallic polymer precursor," AM. CHEM. SOC. POLYMER DIV. POLYMER PRPRT. 25, 8 (1984).

18. K. A. Brown-Wensley, R. A. Sinclair, U.S. Pat. No. 4,537,942 (1985).

19. A. D. Seyferth, T. G. Wood, H. J. Tracy, J. L. Robinson, "Near-Stoichiometric Silicon Carbide from an Economical Polysilane Precursor," J. AM. CERAM. Soc. 75, 1300 (1992).

20. A. D. Seyferth, Y-F. Yu, "Method for Forming New Preceramic Polymers Containing Silicon, U.S. Pat. No. 4,639,501 Jan. 1987. b. D. Seyferth, Y. F. Yu, G. E. Koppetsch, "Method for Forming New Preceramic Polymers Containing Silicon," U.S. Pat. No. 4,719,273, Jan. 1988. c. D. Seyferth, H. J. Tracy, J. L. Robinson, U.S. Pat. No. 5,204,380, (1993).

21. D. Seyferth, C. A. Sobon, J. Borm, "A New Procedure for "Up-Grading" The Nicalon Polycarbosilane and Related Si-H Containing Organosilicon Polymers New J. CHEM. 14, 545–7 (1990).

22. D. Seyferth, Y-F. Yu., "The Preceramic Polymer Route to Silicon-Containing Ceramics," in *Design of New Materials,"* D. L. Cocke, A. Clearfield, eds; Plenum Press, N.Y.. 1987 pp. 79–94.

23. M. D. Curtis and P.S. Epstein, ADV. ORGANOMET. CHEM. 19, 213 (1981).

24. A. Y. Mu, J. F. Harrod in *Inorganic and Organometallic Oligomers and Polymers,* IUPAC 33rd Symp. on Macromol., J. F. Harrod, R. M. Laine, eds., Kluwer Publ., Dordrecht, 1991, 23. b. J. F. Harrod, in *Inorganic and Organometallic Polymers with Special Properties,* Laine, R. M. ed.: NATO ASI Ser. E. Vol. 206; Kluwer Publ., Dordrecht, 1991; p. 87 and references therein. c. J. F. Harrod, private communication.

25. a. T. D. Tilley, "The Coordination Polymerization of Silanes to Polysilanes by a "σ-Bond Methathesis" Mechanism. Implications for Linear Chain Growth," Acc. CHEM. RES. 26, 22–9 (1993). b. Tilley, T. D., Woo, H. G. in *Inorganic and Organometallic Oligomers and Polymers,* IUPAC 33rd Symp. on Macromol., Harrod, J. F. 1 Laine, R. M. Eds., Kluwer Publ., Dordrecht (1991) 3.

26. Z-F. Zhang, F. Babonneau, R. M. Laine, Y. Mu, J. F. Harrod, J. A. Rahn, "Poly(methylsilane)—A High Ceramic Yield Precursor to Silicon Carbide," J. AM. CERAM. Soc. 74, 670 (1991).

27. a. Z-F. Zhang, S. Scotto, R. M. Laine, "Processing of silicon carbide fiber with controlled stoichiometry using polymethylsilane, —[MeSiH]$_x$—," Mater. Res. Soc. Symp. Proc. 327, *Covalent Ceramics II: Nonoxides* R. Gottschalk ed., M R S, Pittsburg (1994) pp 207–13. b. Z-F. Zhang, S. Scotto, R. M. Laine, "Pure silicon carbide fibers from polymethylsilane," in CERAM. ENG. SCI. PROC. 15, 152–61 (1994). c. R. M. Laine, Z.-F. Zhang, K. W. Chew, M. Kannisto, C. Scotto, "Synthesis and Processing of Silicon Carbide Fibers: State-of-the-Art," in *Ceramic Processing Science and Technology,* Publ. AM. CER. Soc., Westerville, OH, H. Hausner, G. Messing, S. Hirano, eds. (1995) pp.

179–86. d. Y. Mu, R. M. Laine, J. F. Harrod, "Some Further Observations on Polymethylsilane as a Precursor for Silicon Carbide," APPL. ORGANOMET. CHEM. (1994) 8, 95–100.

28. J. P. Banovetz, R. M. Stein, R. M. Waymouth, ORGANOMETALLICS 10, 3430 (1991).

29. Z. F. Zhang, Ph.D. Thesis, University of Michigan, 1996.

30. S. Prochazka and R. M. Scanlan, "Effect of boron and carbon on sintering of SiC," J. AM. CERAM. SOC., 58 [1–2], 72, (1975).

31. S. Prochazka, "Sintering of silicon carbide," in *Ceramics for High-Performance Applications,* J. J. Burke, A. E. Gorum, R. N. Katz Eds; Book Hill, Chestnut Hill, Mass.; 1974, pp. 239.

32. K. M. Friederich and R. L. Coble, "Influence of boron on chemical inter-diffusion in SiC during conversion of silicon fibers to SiC," J. AM. CERAM. SOC., 66 [8] C-141-2 (1983).

33. C. Greskovich, J. H. Rosolowski, "Sintering of covalent solids," J. AM. CERAM. SOC., 59 [7–8] 336 (1975).

34. J. E. Lane, C. H. Carter, Jr., R. E. Davis, "Kinetics and mechanism of high-temperature creep in silicon carbide: III, sintered α-silicon carbide," J. AM. CERAM. Soc., 71 [4] 281–95 (1988).

35. T. Kobayashi, T. Sakakura, T. Hayashi, M. Yumura, M. Tanaka, CH-M. LETT. 1157 (1992).

36. E. Hengge, M. Weinberger, C. Jammegg, J. ORGANOMET. CHEM. 410, C1-C4 (1991).

37. E. Hengge, *Organosilicon Chem. II* 2, 275 (1996).

38. E. Hengge, M. Weinberger, J. ORGANOMETALLIC CHEM. 433, 21–34 (1992).

39. a. R. H. Baney, J. H. Gaul Jr., T. K. Hilty, ORGANOMETALLICS 2, 859 (1983). b. R. H. Baney, U.S. Pat. No. 4,310,482, (1982).

40. A. Tazi Hemida, J.-P. Pillot, M. Birot, J. Dunogues, R. Pailler, J. CHEM. Soc. CHEM. COMM. 2337 (1994).

41. R. J. P. Corriu, M. Enders, S. Huille, J. J. E. Moreau, CHEM. MATER. 6, 15 (1994).

42. T. L. Smith, U.S. Pat. No. 4,631,179 (1986).

43. a. L. V. Interrante, Q. H. Shen, MACROMOLECULES 29, 5788, (1996). b. L. V. Interrante, C. W. Whitmarsh, C-Y Yang, W. Sherwood, "Fabrication of SiC Matrix Composites by Liquid Phase Infiltration with a Polymeric Precursor," in *Silicon-Based Structural Ceramics,* MAT. RES. Soc. SYMP. PROC., Vol. 365, MATER. RES. Soc., Pittsburgh (1995) PP. 139–47.

44. A. D. C. Deleeuw, J. Lipowitz, P. P. Lu, U.S. Pat. No. 5,071,600 (1991). b. J. Lipowitz, J. A. Rabe, G. A. Zank, CEPAM. ENG. SCI. PROC. 12, 1819 (1991). c. J. Lipowitz, T. Barnard, J. Bujalski, J. A. Rabe, G. A. Zank, A. Zangvil, Y. Xu, COMP. SCI AND TECH. 51, 167 (1994).

45. J. Lipowitz, paper presented at the American Ceramics Society Pacific Rim Conference held Dec., 1995, Seattle.

46. C. P. Jacobson, L. C. DeJonghe, "Method for Stabilizing Polycarbosilane Derived Si-C-O Containing Fibers, PCT WO 94/02430, Publ. March, 1994.

47. W. Toreki, C. D. Batich, M. D. Sacks, M. Saleem, G. Choi, A. A. Morrone, COMPT. SCI. AND TECH. 51, 145 (1994).

48. M. D. Sacks, G. W. Scheiffele, M. Saleem, G. A. Staab, A. A. Morrone, T. J. Williams, MAT. RES. Soc. SYMP. PROC. 1995, 365, 3.

49. T. Wideman, L. G. Sneddon, "Convenient Procedure for the Laboratory Preparation of Borazine," INORGAN. CHEM. 34, 1002–3 (1995).

50. C. K. Saha, G. Zank, A. Ghosh, Application of Organosilicon Pre-SiC Polymer Technology to Optimize Rapid Prototyping of Ceramic Components," in *Manufacture of Ceramic Components,* CERAMIC TRANS. 49, 155–60 (1995).

Having now fully described the invention, it will be apparent to one of ordinary skill in the art that many changes and modifications can be made thereto without departing from the spirit or scope of the invention as set forth herein.

What is claimed is:

1. A substantially non-pyrophoric polymethylsilane, comprising the dehalocoupled polymerization product of a starting material comprising $MeHSiCl_2$, said polymethylsilane containing about 0.1 weight percent or more of residual chlorine, and exhibiting a methyl hydrogen to silane hydrogen ratio of greater than 4:1.

2. The substantially non-pyrophoric polymethylsilane of claim 1, said non-pyrophoric polymethylsilane prepared by reacting $MeHSiCl_2$ with an alkali metal in the presence of an aprotic solvent such that the dehalocoupled polymerization product has a number average molecular weight greater than 600 Da and contains from about 0.5 weight percent to about 3 weight percent chlorine.

3. The non-pyrophoric polymethylsilane of claim 1 wherein said dehalocoupled polymerization product is prepared by dehalocoupling $MeHSiCl_2$ with from about 2.0 to about 2.3 equivalents of alkali metal per equivalent of $MeHSiCl_2$.

4. The non-pyrophoric polymethylsilane of claim 1 wherein said chlorine content is from about 0.5 to about 3 weight percent, and said non-pyrophoric polymethylsilane has a number average molecular weight in excess of 600 Da.

5. A process for the preparation of the substantially non-pyrophoric polymethylsilane of claim 1, said process comprising:

dehalocoupling $MeHSiCl_2$ in the presence of an effective amount of a dehalocoupling reagent, said effective amount being such that a dehalocoupled polymerization product retains in excess of 0.1 weight percent chlorine, said dehalocoupling taking place in a solvent in which said dehalocoupled polymerization product remains soluble.

6. The process of claim 5 wherein said dehalocoupling reagent comprises one or more alkali metal(s).

7. The process of claim 5 wherein said solvent comprises one or more aromatic solvents.

8. The process of claim 5 wherein said substantially non-pyrophoric polymethylsilane has a number average molecular weight of about 600 Da or more.

9. The process of claim 5 wherein said silicon carbide precursor contains a major fraction of polymeric product molecules having molecular weights in excess of 10,000 Da.

* * * * *